US012722349B2

(12) United States Patent
Landry et al.

(10) Patent No.: US 12,722,349 B2
(45) Date of Patent: Sep. 1, 2026

(54) SYSTEMS AND METHODS FOR MANUFACTURING A HOLLOW MULTI-BLADE ROTOR

(71) Applicant: Textron Innovations Inc., Providence, RI (US)

(72) Inventors: Francois Landry, St-Hippolyte (CA); Olivier Blanc, Pointe-Calumet (CA); Daniel Poirier, Mirabel (CA); Joffrey Renaud, Montreal (CA)

(73) Assignee: Textron Innovations, Inc., Providence, RI (US)

( * ) Notice: Subject to any disclaimer, the term of this patent is extended or adjusted under 35 U.S.C. 154(b) by 91 days.

(21) Appl. No.: 18/754,453

(22) Filed: Jun. 26, 2024

(65) Prior Publication Data

US 2025/0229498 A1 Jul. 17, 2025

Related U.S. Application Data

(63) Continuation-in-part of application No. 18/412,159, filed on Jan. 12, 2024, now Pat. No. 12,358,618.

(51) Int. Cl.

*B29C 70/44* (2006.01)
*B29K 307/04* (2006.01)
*B29L 31/08* (2006.01)

(52) U.S. Cl.

CPC .......... *B29C 70/44* (2013.01); *B29K 2307/04* (2013.01); *B29L 2031/082* (2013.01); *Y10T 29/49327* (2015.01)

(58) Field of Classification Search

CPC ... B64C 27/32; F01D 5/147; F04D 29/26-38; F04D 25/088; B29L 2031/082

See application file for complete search history.

(56) References Cited

U.S. PATENT DOCUMENTS

2019/0176407 A1* 6/2019 Blanc .................. B29C 66/4329

* cited by examiner

*Primary Examiner* — Alison L Hindenlang
*Assistant Examiner* — Debjani Roy
(74) *Attorney, Agent, or Firm* — Whitaker Chalk Swindle & Schwartz PLLC; Enrique Sanchez, Jr.; Juan Vasquez

(57) ABSTRACT

A system for manufacturing a hollow multi-blade rotor includes a manifold having upper and lower manifold sections. The upper manifold section includes sealing ports that include sealing rings. The lower manifold section includes sealing port apertures that are configured to accept the sealing ports of the upper manifold section. The system further includes multiple pressure pads that are configured to collectively form a center hub area of the hollow multi-blade rotor within a mold during manufacturing of the hollow multi-blade rotor. Each pressure pad includes a hollow inner chamber and a hollow bladder extension. Each bladder extension guides an unsealed end of an inflatable bladder up through a sealing port aperture, thereby enabling the unsealed end of the inflatable bladder to be sealed between the sealing port aperture and the sealing ring of a sealing port when the upper manifold section is coupled to the lower manifold section.

9 Claims, 35 Drawing Sheets

SYSTEMS AND METHODS FOR MANUFACTURING A HOLLOW MULTI-BLADE ROTOR

CROSS-REFERENCE TO RELATED APPLICATIONS

The present application is a Continuation-in-Part of U.S. patent application Ser. No. 18/412,159, filed on Jan. 12, 2024, the entirety of which is herein incorporated by reference for all purposes.

TECHNICAL FIELD

The present disclosure relates generally to rotor blades, hubs, and assemblies, and more particularly to systems and methods for manufacturing a hollow multi-blade rotor.

BACKGROUND

Rotors and propellers, especially those that are larger than those used on small unmanned aerial vehicles (UAVs), usually consist of an assembly of individual blades that are each connected to a central hub. For example, a typical rotor may consist of two individual blades that are coupled to a central hub with bolts, where a rotor/propeller is an assembly of blades and a hub or a single solid machined part. While such multi-component configurations permit easier manufacturing of blade components and hubs, such configurations are typically heavier than desired due to assembly requirements. For example, for short layups, resin injection can be used to fill the gaps, and for long layups, larger stress safety margins can be used to accept wrinkles. However, both solutions result in overweight parts.

SUMMARY

The present disclosure achieves technical advantages as systems and methods of manufacturing a hollow multi-blade rotor. In some embodiments, a hollow multi-blade rotor (or propeller) can include a hollow hub area configured to couple the hollow multi-blade rotor to a motor. The hollow hub area can include a main hub aperture and a plurality of bolt apertures. The hollow multi-blade rotor can further include a plurality of hollow blades and an internal hollow cavity that runs continuously through the plurality of hollow blades and the hollow hub area. In certain embodiments, the hollow hub area and/or one or more of the hollow blades can be a single unitary piece (member).

In some embodiments, a system for manufacturing a hollow multi-blade rotor includes a manifold having an upper manifold section and a lower manifold section that is configured to couple to the upper manifold section. The upper manifold section includes a plurality of sealing ports that each have a sealing ring. The upper manifold section further includes a pressure port fluidly coupled to each of the plurality of sealing ports and configured to direct air pressure from an external air pressure source to each of the plurality of sealing ports. The lower manifold section includes a plurality of sealing port apertures. Each sealing port aperture is configured to accept one of the sealing ports of the upper manifold section. The system further includes a plurality of pressure pads that are configured to collectively form a center hub area of the hollow multi-blade rotor within a mold during manufacturing of the hollow multi-blade rotor. Each pressure pad includes a hollow inner chamber configured to accept an inflatable bladder and a hollow bladder extension that extends from a top surface of the pressure pad and is configured to contact a lower surface of the lower manifold section. The bladder extension is configured to guide an unsealed end of the inflatable bladder up through a particular sealing port aperture of the lower manifold section, thereby enabling the unsealed end of the inflatable bladder to be sealed between the particular sealing port aperture and the sealing ring of a particular sealing port when the upper manifold section is coupled to the lower manifold section.

In some embodiments, a method of manufacturing a hollow multi-blade rotor includes placing a top skin layup onto a top mold and placing a bottom skin layup onto a bottom mold. The method further includes placing a plurality of edge layups along a plurality of wing edges of the bottom skin layup in the bottom mold. The method further includes placing a plurality of pressure pads on the bottom skin layup in the bottom mold and placing a plurality of inflatable bladders onto the bottom skin layup in the bottom mold. The method further includes wrapping the plurality of edge layups around a plurality of edges of the inflatable bladders and passing an unsealed end of each particular inflatable bladder through a corresponding pressure pad of the plurality of pressure pads. The method further includes securing the top mold with the top skin layup onto the bottom mold and positioning a lower manifold section of a manifold apparatus onto the plurality of pressure pads. The method further includes coupling an upper manifold section of the manifold apparatus to the lower manifold section such that a plurality of sealing ports of the upper manifold section seals the unsealed ends of the plurality of inflatable bladders. The method further includes inflating the plurality of inflatable bladders to a predetermined pressure and applying heat to the top and bottom molds after inflating the plurality of inflatable bladders, thereby curing the top and bottom skin layups into a shape of the hollow multi-blade rotor.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1A:
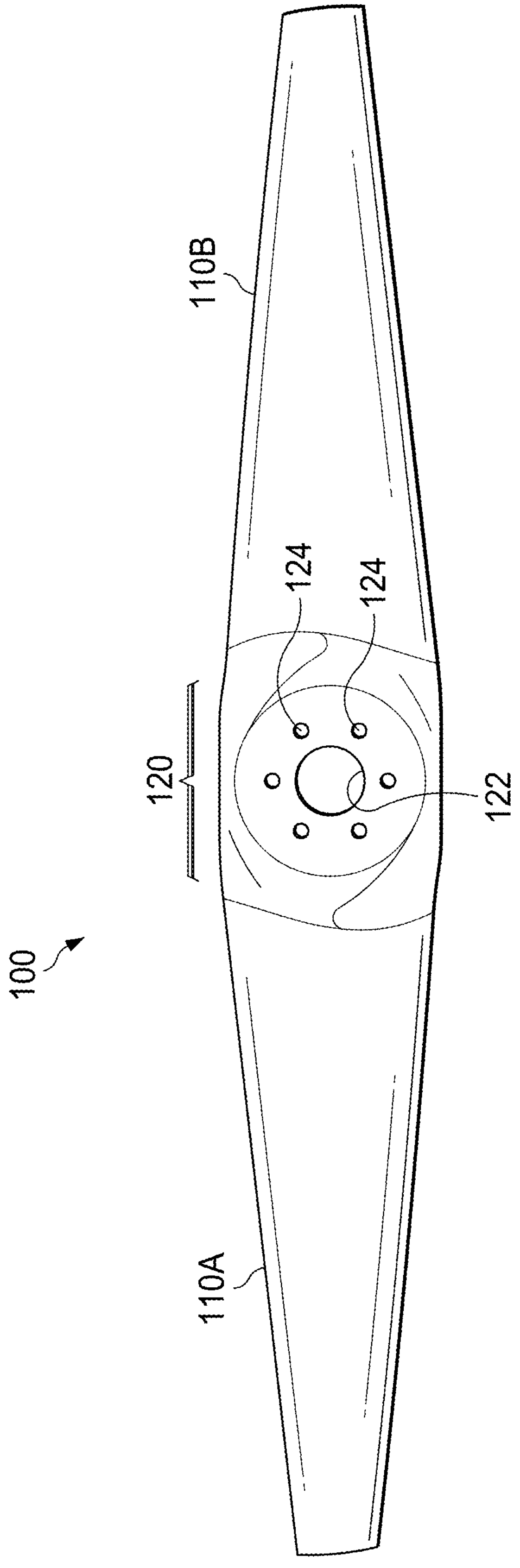
FIGS. 1A-1B illustrate various views of a hollow multi-blade rotor, according to certain embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Rotors and propellers, especially those that are larger than those used on small unmanned aerial vehicles (UAVs), usually consist of an assembly of individual blades that are each connected to a central rotor hub. For example, a typical rotor may consist of two individual blades that are coupled to a central rotor hub with bolts. The rotor assembly may then be coupled to the motor. While such multi-component configurations permit easier manufacturing of blade components and hubs, such configurations are typically heavier than desired due to assembly requirements.

To address these and other problems associated with typical multi-component rotor assemblies, the enclosed embodiments provide hollow one-piece multi-blade rotor systems, apparatuses, manufacturing methods, and manufacturing tools. In general, the hollow one-piece multi-blade rotor of the disclosed embodiments includes a hollow hub area and a plurality of hollow blades that are formed as a single member (i.e., one piece as opposed to multiple separate pieces that are manufactured separately and then coupled together with fasteners). The hollow hub area is configured to couple the hollow multi-blade rotor to a motor and includes a main hub aperture and a plurality of bolt apertures. The hollow one-piece multi-blade rotor further includes an internal hollow cavity that runs continuously through the plurality of blades and the hub area. The internal hollow cavity can be devoid of any filler material. By providing a hollow one-piece multi-blade rotor, embodiments of the disclosure provide significant weight savings over typical rotors. This may improve the efficiency and range of aircraft such as VTOLs.

Figure 1B:
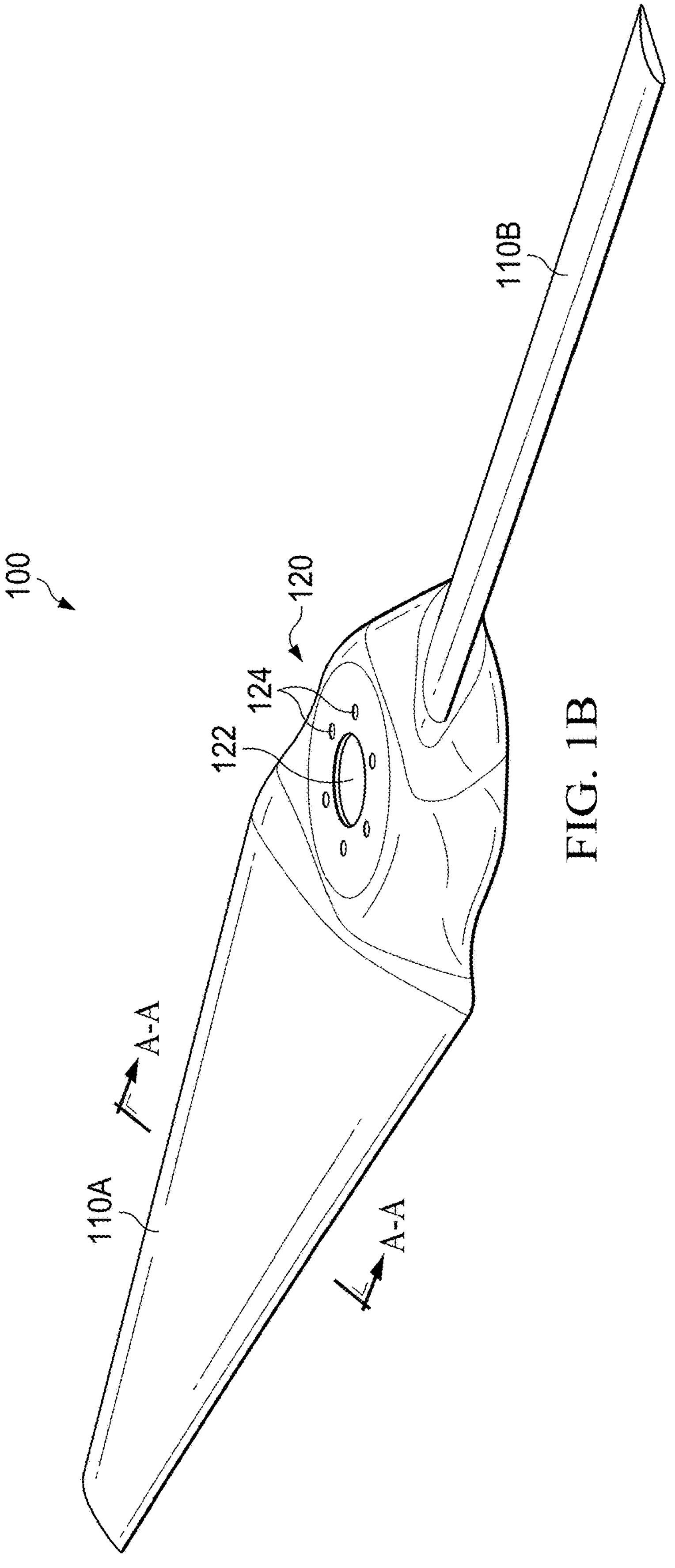

FIGS. 1A-1B illustrate various views of a hollow multi-blade rotor 100, according to certain embodiments. Hollow multi-blade rotor 100 includes multiple hollow blades 110 and a hollow hub area 120. Hollow hub area 120 includes a main hub aperture 122 and bolt apertures 124. While a specific number of hollow blades 110 and bolt apertures 124 are illustrated in FIGS. 1A and 1B, other embodiments may include other amounts of hollow blades 110 and bolt apertures 124.

Figure 2:
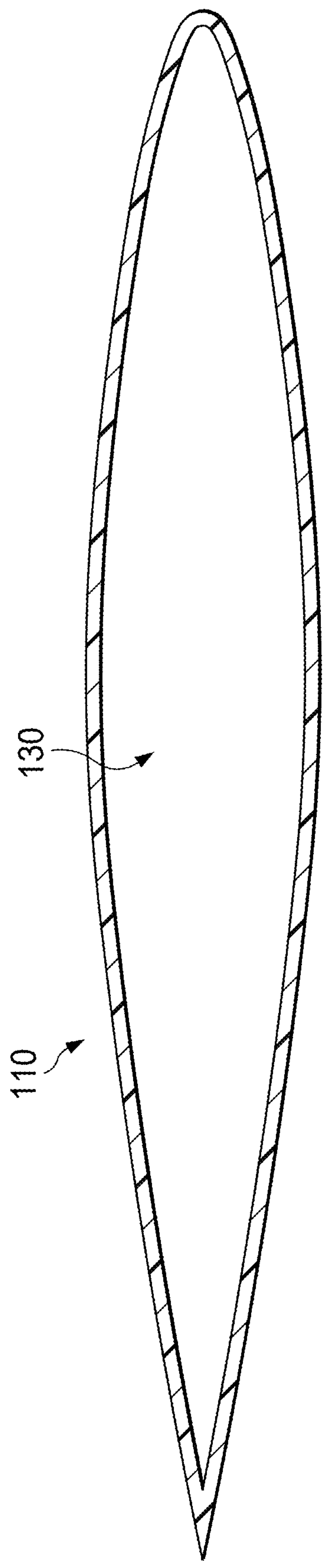
FIG. 2 illustrates a cross sectional view of the hollow multi-blade rotor of FIGS. 1A-1B, according to certain embodiments.

Hollow blades 110 can be fixed-pitch blades that create thrust when hollow multi-blade rotor 100 is rotated by a motor. In some embodiments, hollow multi-blade rotor 100 includes two hollow blades 110 as illustrated in the included figures: a first hollow fixed-pitch blade 110A and a second hollow fixed-pitch blade 110B. In other embodiments, hollow multi-blade rotor 100 may include any other appropriate number of hollow blades 110 (e.g., three, four, five, etc.) In general, hollow blades 110 include an internal hollow cavity 130 as illustrated in FIG. 2 that reduces the overall weight of hollow multi-blade rotor 100. FIG. 2 illustrates a cross sectional view of hollow blade 110 at cut A-A of FIG. 1B and illustrates internal hollow cavity 130. In some embodiments, internal hollow cavity 130 is devoid of filler material (e.g., foam and the like) and instead is filled with air. In some embodiments, hollow blades 110 are formed from carbon fiber composite materials in a layup process as described in more detail below in reference to FIG. 7. In some embodiments, hollow blades 110 include edge layups 140 as illustrated and described below in reference to FIG. 4.

Hollow hub area 120 is generally configured to couple hollow multi-blade rotor 100 to a motor (not illustrated). Hollow hub area 120, like hollow blades 110, may be devoid of any fillers (e.g., foam and the like). In some embodiments, hollow hub area 120 includes main hub aperture 122. In some embodiments, main hub aperture 122 is circular in shape as illustrated and enables upper hub fitting 510 and lower hub fitting 520 to be coupled together as described below. In other embodiments, main hub aperture 122 may have any other appropriate shape.

Hollow hub area 120 may include multiple bolt apertures 124 that permit bolts to couple hollow multi-blade rotor 100 to a motor. For example, coupling bolts 530 (illustrated in FIGS. 5A-5B) may be used in conjunction with upper hub fitting 510 and lower hub fitting 520 to couple hollow multi-blade rotor 100 to a motor, as described in more detail below. While the illustrated embodiments include six bolt apertures 124, other embodiments may include any other appropriate number of bolt apertures 124.

Figure 3:
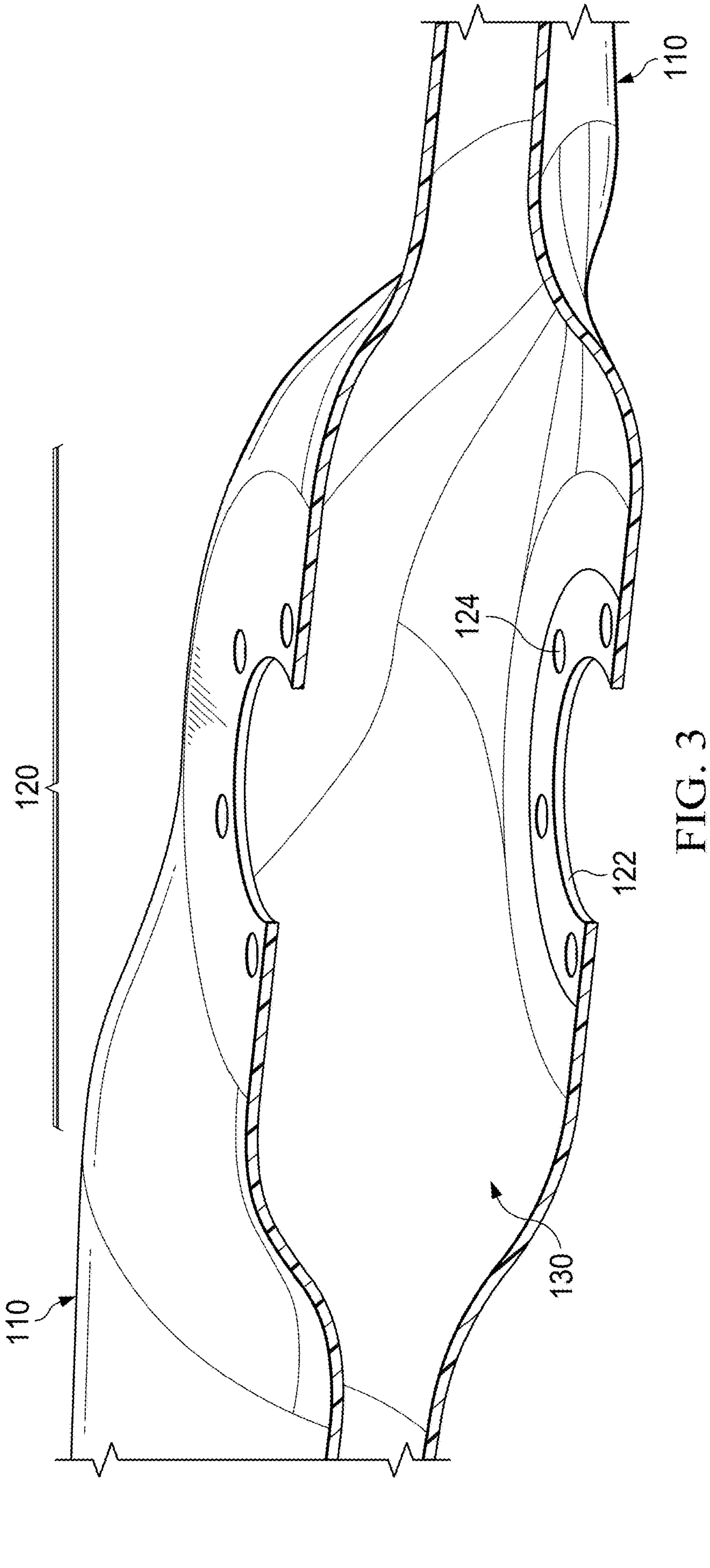
FIG. 3 illustrates a cross sectional view of the hub area of the hollow multi-blade rotor of FIGS. 1A-1B, according to certain embodiments.

FIG. 3 illustrates a cross sectional view of hollow hub area 120, according to certain embodiments. This figure illustrates how hollow blades 110 and hollow hub area 120 are formed to be a single unit/member (i.e., one piece as opposed to multiple separate pieces that are manufactured separately and then coupled together with fasteners). Unlike typical rotors where blades are attached to a solid hub using bolts, hollow multi-blade rotor 100 may be formed in molds (as described below) using composites such as carbon fiber in order to form hollow blades 110 and hollow hub area 120 as a single unit, thereby eliminating the need for fastening hollow blades 110 to hollow hub area 120. This enables hollow multi-blade rotor 100 to be lighter and more efficient than typical rotors. FIG. 3 additionally illustrates how internal hollow cavity 130 runs continuously through the hollow multi-blade rotor 100 and hollow hub area 120. That is, hollow multi-blade rotor 100 does not include separate blades that are manufactured separately and then subsequently attached to a solid hub. Instead, hollow blades 110 and hollow hub area 120 are formed as a single unit, thereby creating internal hollow cavity 130 that runs continuously through the hollow multi-blade rotor 100 and hollow hub area 120.

Figure 4:
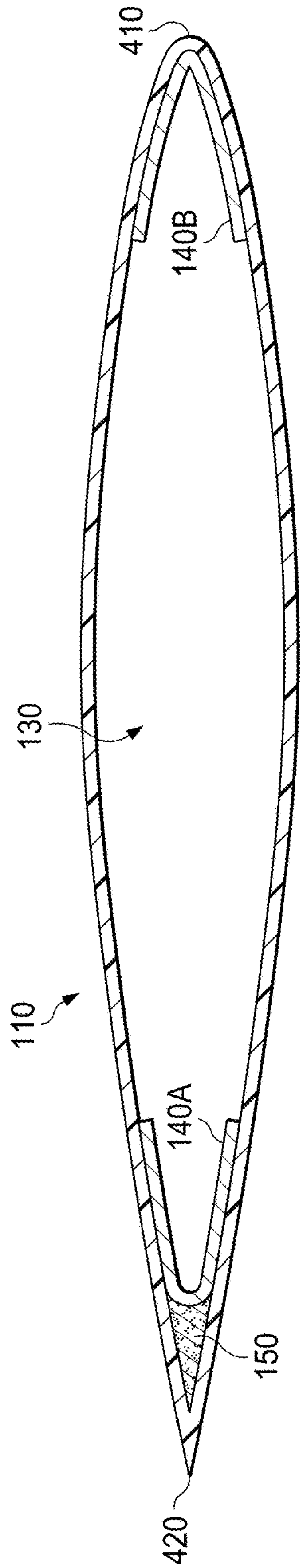
FIG. 4 illustrates a cross sectional view of a hollow multi-blade rotor that includes internal edge layups, according to certain embodiments.

In some embodiments, hollow multi-blade rotor 100 includes additional internal components to strengthen vital areas of hollow multi-blade rotor 100. For example, FIG. 4 illustrates a cross sectional view of a hollow multi-blade rotor 100 that includes internal edge layups 140 to strengthen edges of hollow multi-blade rotor 100, according to certain embodiments. In some embodiments, hollow multi-blade rotor 100 includes a first edge layup 140A and a second edge layup 140B. Edge layups 140 (e.g., 140A and 140B) are located internal to hollow multi-blade rotor 100 and may each be single-piece units that span from the outer tip (or near the outer tip) of one hollow blade 110, through hollow hub area 120, and to the outer tip (or near the outer tip) of opposite the hollow blade 110. In these embodiments, one end portion of each edge layup 140 is adjacent to a leading edge of one hollow blade 110 while an opposite end portion of the same edge layup 140 is adjacent to a trailing edge of the opposite hollow blade 110. For example, as illustrated in FIG. 4, one end portion of edge layup 140B is adjacent to a leading edge 410 of one hollow blade 110 while an opposite end portion of the same edge layup 140B is adjacent to a trailing edge of the opposite hollow blade 110 (not illustrated in FIG. 4). At the same time, one end portion of edge layup 140A is adjacent to a trailing 420 of hollow blade 110 while an opposite end portion of the same edge layup 140A is adjacent to a leading edge of the opposite hollow blade 110 (not illustrated in FIG. 4). Additional details about edge layups 140 and how they are formed and placed within hollow multi-blade rotor 100 are discussed in more detail below in reference to FIG. 7.

In embodiments that include edge layups 140, hollow multi-blade rotor 100 may additionally include edge filler 150 between edge layups 140 and edges of hollow blades 110 (i.e., internal to hollow blades 110 but outside internal hollow cavity 130). For example, as illustrated in FIG. 4, hollow multi-blade rotor 100 may include edge filler 150 between trailing edge 420 and edge layup 140A. Edge filler 150 may be made of any suitable material (e.g., foam, epoxy resin, etc.) in order to strengthen edges of hollow blades 110, especially sharp edges such as trailing edge 420.

Figure 5A:
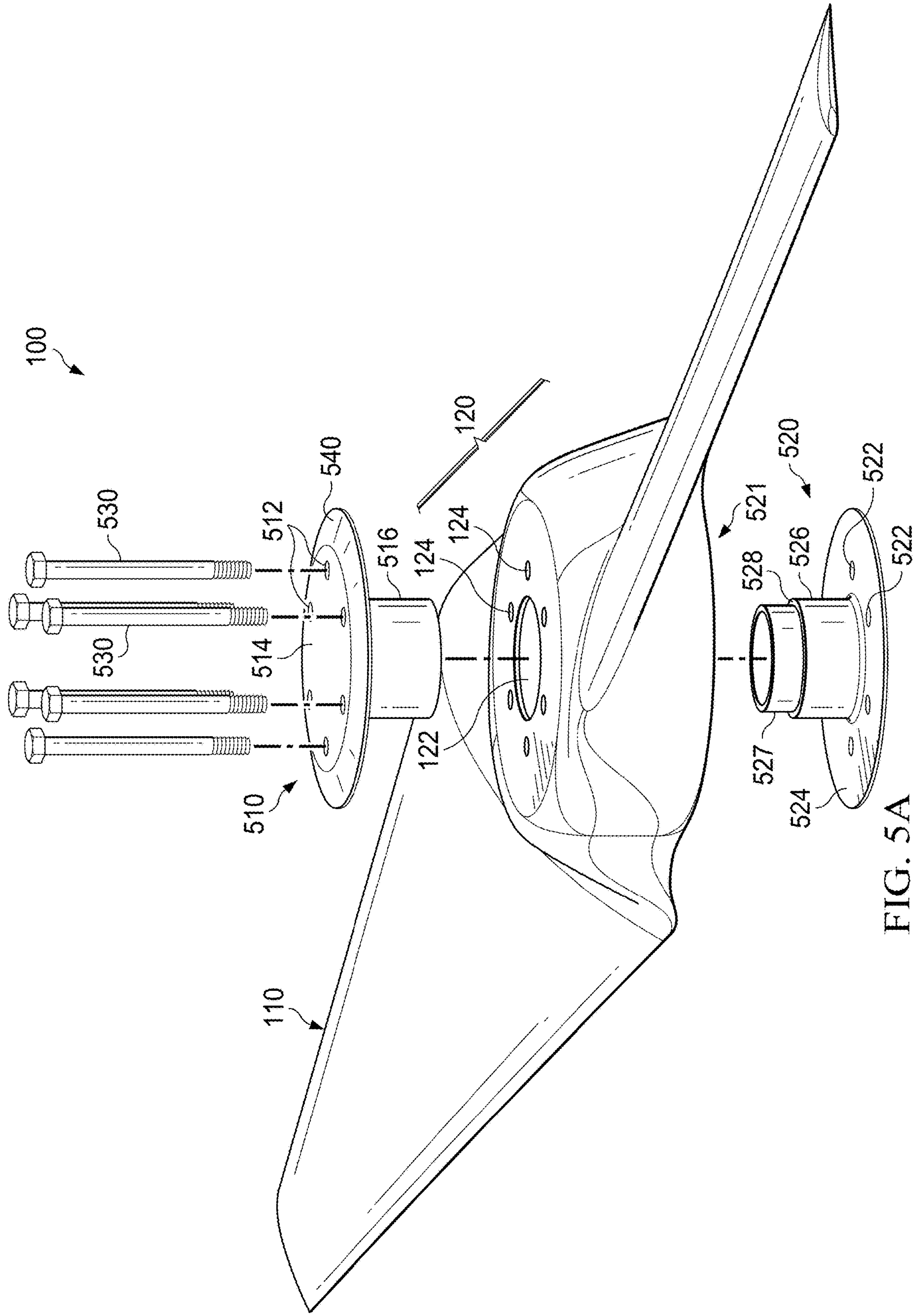
FIGS. 5A and 5B illustrate a hub system of a hollow multi-blade rotor, according to certain embodiments.
Figure 5B:
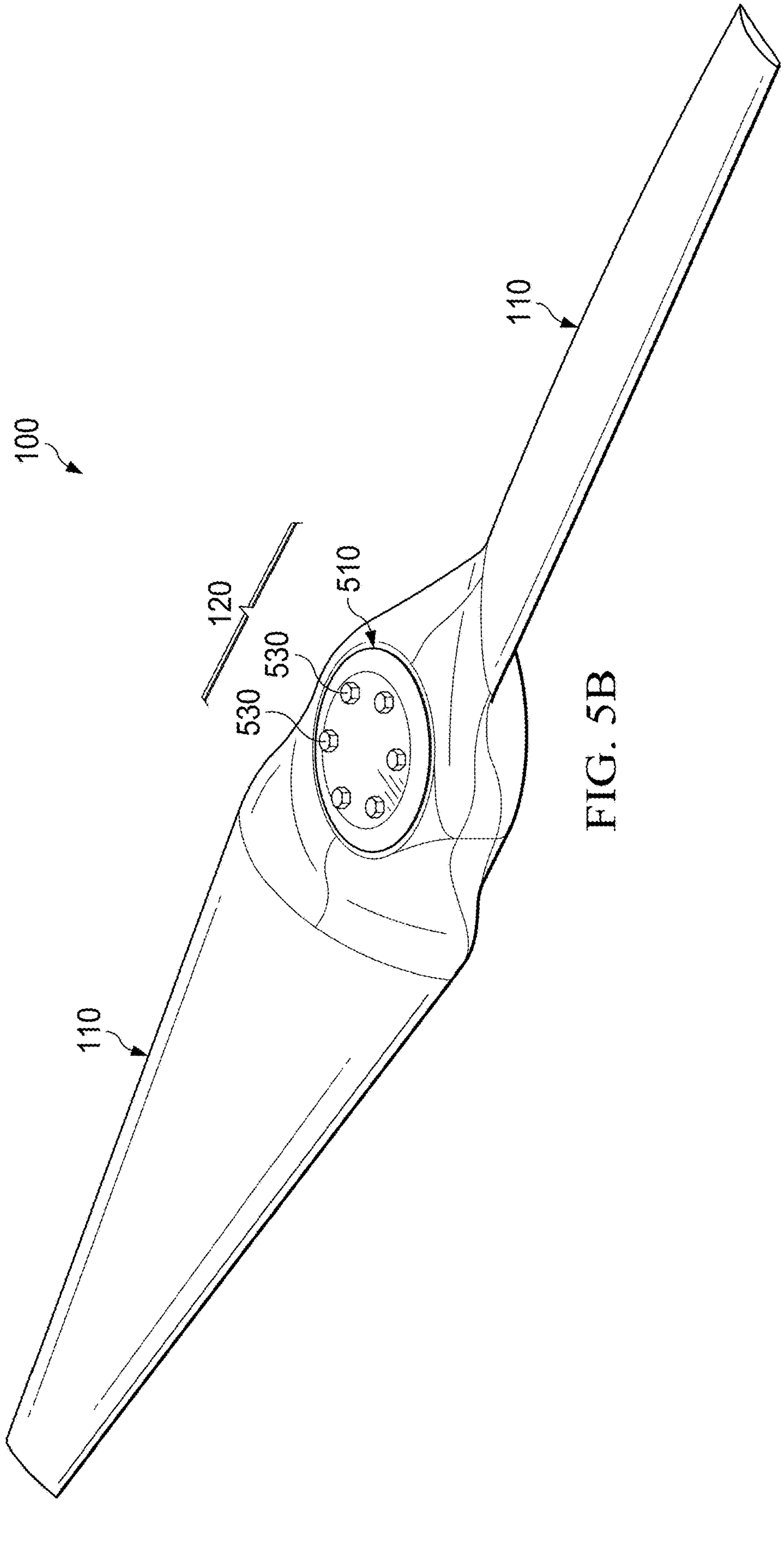
Figure 5C:
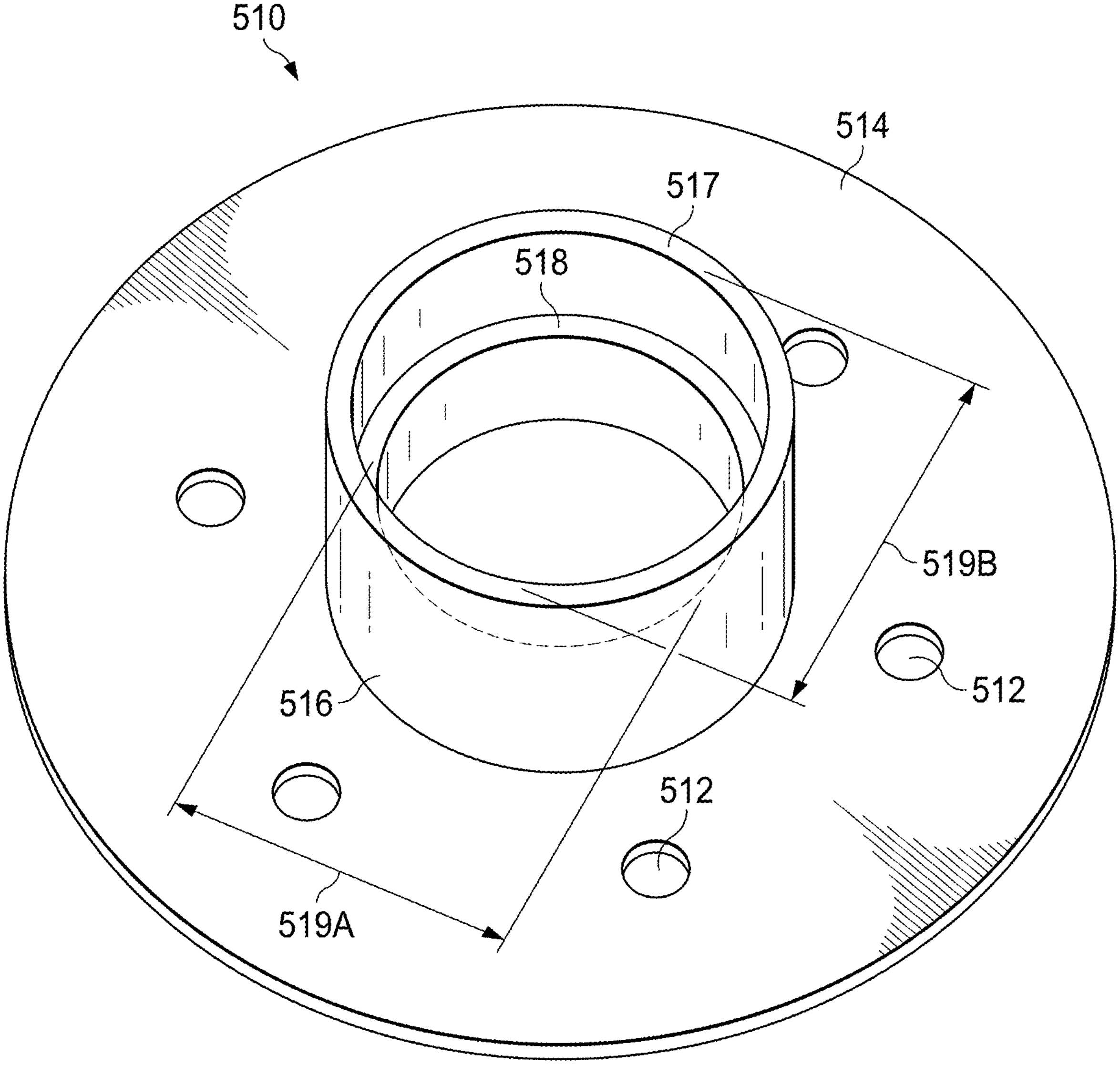
FIGS. 5C and 5D illustrate an upper hub fitting of the hub system of FIGS. 5A-5B, according to certain embodiments.
Figure 5D:
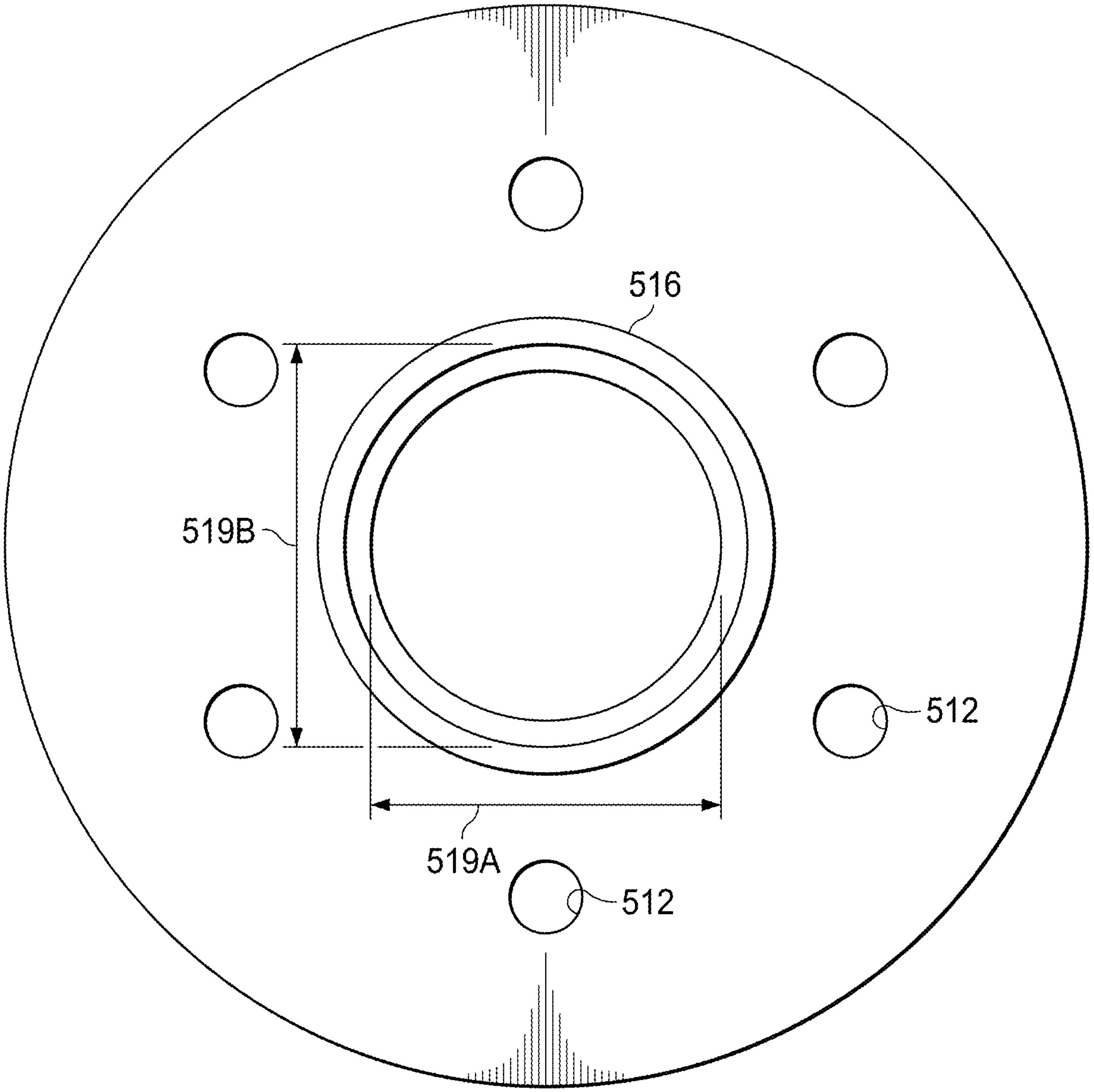
Figure 5E:
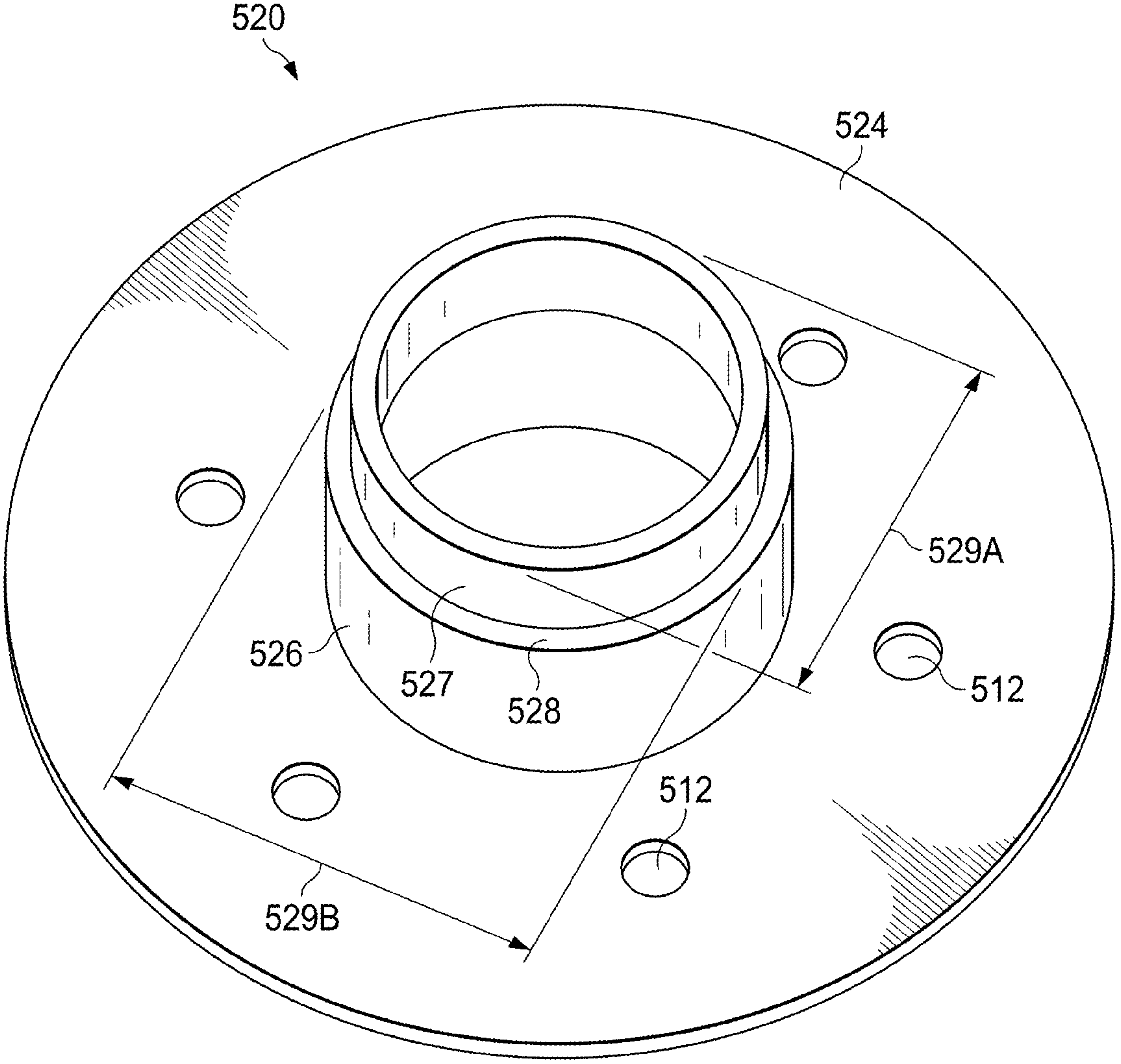
FIGS. 5E and 5F illustrate a lower hub fitting of the hub system of FIGS. 5A-5B, according to certain embodiments.
Figure 5F:
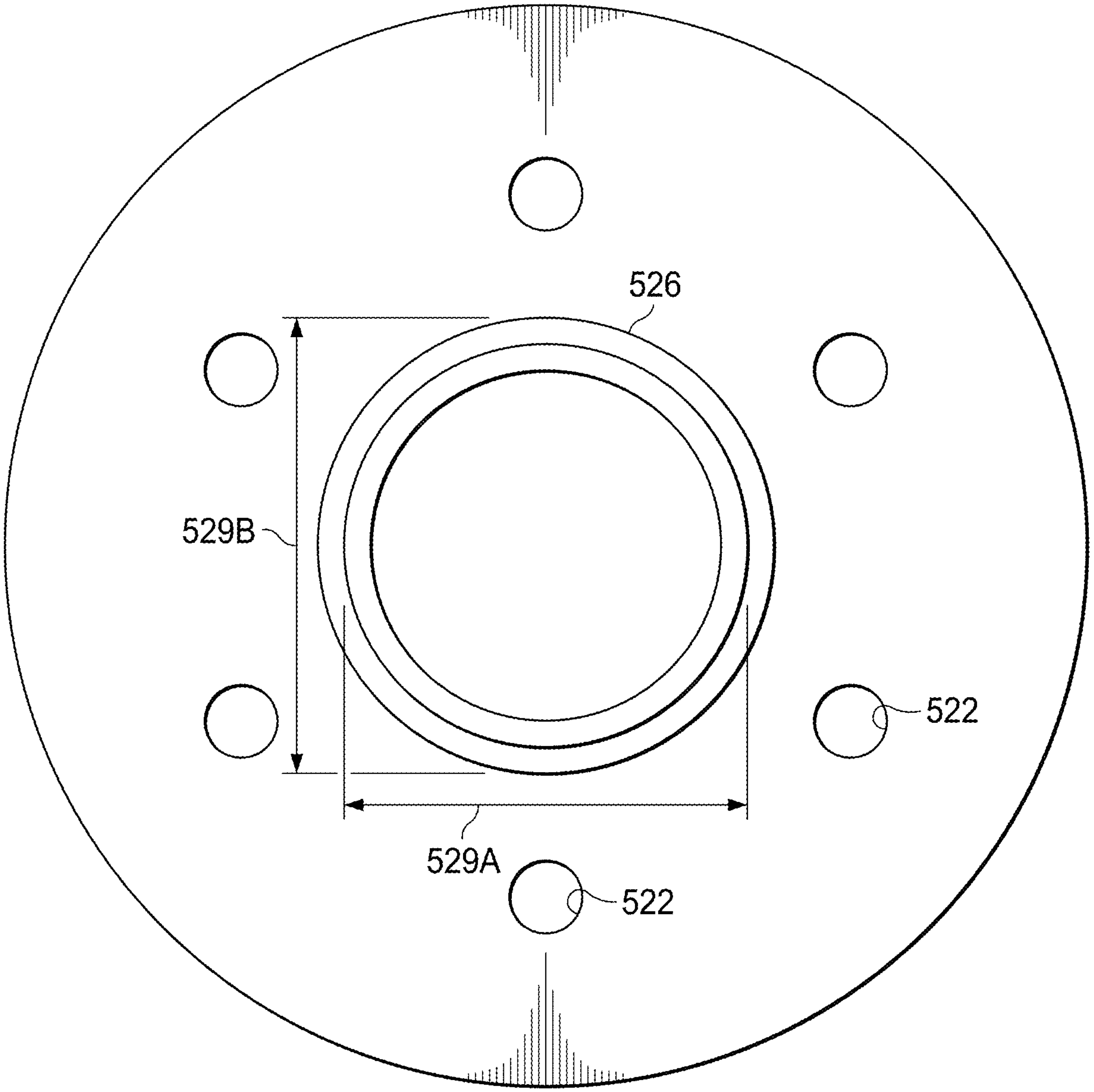
Figure 5G:
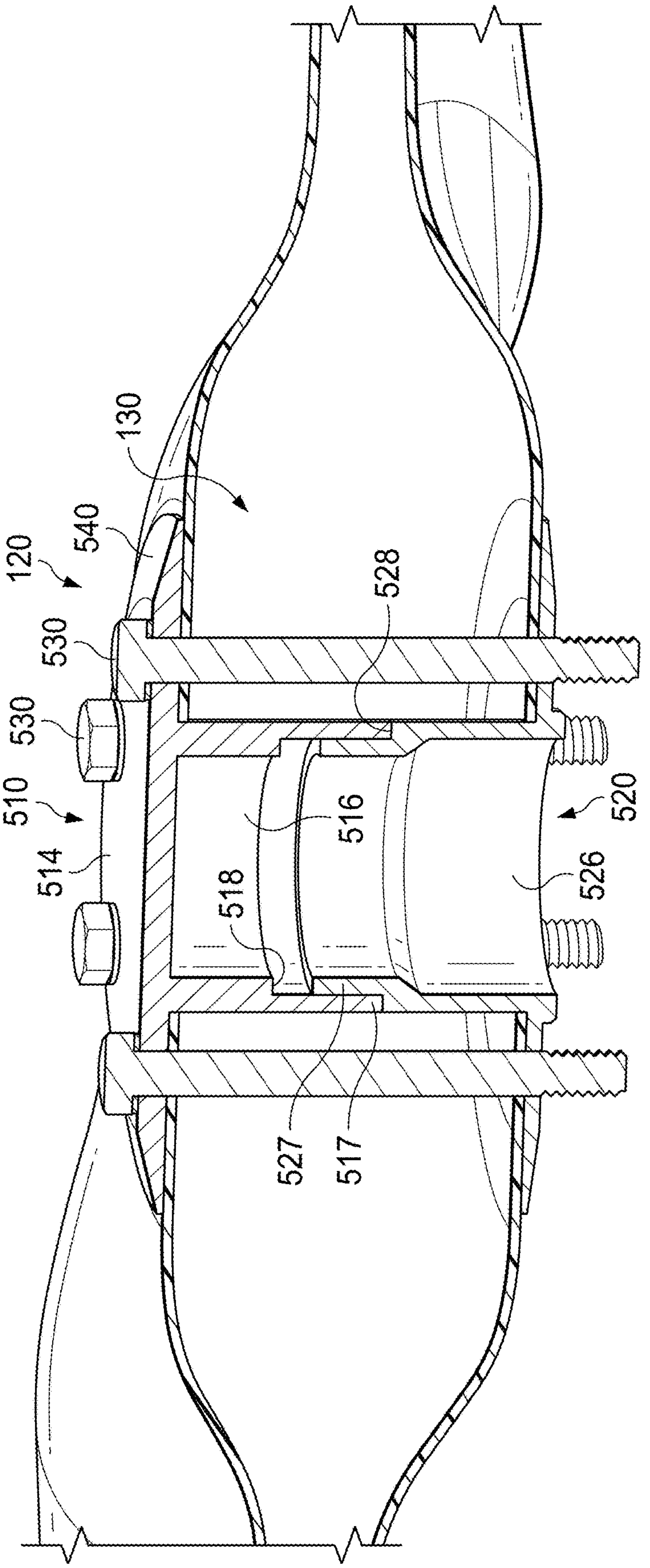
FIG. 5G illustrates a cross sectional view of the of the hub system of FIGS. 5A-5B, according to certain embodiments.

In order to couple hollow multi-blade rotor 100 to a motor, some embodiments utilize a hub system 500 as illustrated in FIGS. 5A-5G. In general, hub system 500 allows hollow multi-blade rotor 100 to be securely coupled to a motor while preventing hollow multi-blade rotor 100 from deforming or collapsing due to hub area 120 being hollow. Hub system 500 can include an upper hub fitting 510, a lower hub fitting 520, and multiple coupling bolts 530. Hub system will be described in reference to FIGS. 5A-5G in which: FIGS. 5A and 5B illustrate hub system 500; FIGS. 5C and 5D illustrate an upper hub fitting 510 of hub system 500; FIGS. 5E and 5F illustrate a lower hub fitting 520 of hub system 500; and FIG. 5G illustrates a cross sectional view of hub system 500, according to certain embodiments.

Upper hub fitting 510 is one component of hub system 500 that attaches to the outside portion 511 of hollow hub area 120 of hollow multi-blade rotor 100 (i.e., the portion of hollow hub area 120 that is on the opposite side of hollow multi-blade rotor 100 from the motor to which hollow multi-blade rotor 100 is to be attached). In some embodiments, upper hub fitting 510 may be made of any appropriate material such as metal (e.g., aluminum, titanium, and the like), plastic, a composite, or any other appropriate material. Upper hub fitting 510 can include multiple upper hub fitting bolt apertures 512, an upper hub flange 514, and an upper hub tubular member 516. Upper hub fitting bolt apertures 512 may be round holes within upper hub flange 514 that accommodate coupling bolts 530. In some embodiments, upper hub fitting 510 includes six upper hub fitting bolt apertures 512 at sixty degrees spacing that align with bolt apertures 124 of hollow hub area 120. Other embodiments may have additional or fewer upper hub fitting bolt apertures 512 with any other appropriate spacing.

Upper hub flange 514 can be generally circular in shape and provide for a stable surface in which to contact hollow hub area 120 and accommodate coupling bolts 530 as coupling bolts 530 couple hollow multi-blade rotor 100 to a motor. As illustrated in FIGS. 5A, 5C, and 5D, upper hub flange 514 is coupled to and is coaxial with upper hub tubular member 516. In some embodiments, upper hub flange 514 has a larger overall diameter than upper hub tubular member 516. In some embodiments, upper hub flange 514 and upper hub tubular member 516 are a single unit (e.g., upper hub flange 514 and upper hub tubular member 516 are formed as a single piece using die casting or similar techniques). In other embodiments, upper hub flange 514 and upper hub tubular member 516 are separate components that are coupled together (e.g., via welding). In some embodiments, upper hub tubular member 516 has a flat outer surface with a sloped edge 540 around the perimeter of upper hub flange 514. Sloped edge 540 may allow for better aerodynamics as hollow multi-blade rotor 100 rotates. In some embodiments, upper hub fitting 510 may include an aperture (not illustrated) in the center of upper hub flange 514 that is coaxial with upper hub flange 514 and upper hub tubular member 516.

Upper hub tubular member 516 is generally tubular in shape as illustrated in FIGS. 5C and 5D. Upper hub tubular member 516 includes an end portion 517 that is on an opposite end of upper hub tubular member 516 from where upper hub tubular member 516 connects to upper hub flange 514. End portion 517 has an inner diameter 519B. Upper hub tubular member 516 also includes a circular ledge 518 that can be a certain distance from end portion 517. The distance of the circular ledge 518 from the end portion 517 can vary based on the application requirements. Circular ledge 518 is internal to upper hub tubular member 516 as illustrated and has an inner diameter 519A that is less than inner diameter 519B of end portion 517.

Lower hub fitting 520 is one component of hub system 500 that attaches to the inside portion 521 of hollow hub area 120 of hollow multi-blade rotor 100 (i.e., the portion of hollow hub area 120 that contacts the motor to which hollow multi-blade rotor 100 is to be attached). In some embodiments, lower hub fitting 520 may be made of any appropriate material such as metal (e.g., aluminum, titanium, and the like), plastic, a composite, or any other appropriate material. Lower hub fitting 520 can include multiple lower hub fitting bolt apertures 522, a lower hub flange 524, and a lower hub tubular member 526. Lower hub fitting bolt apertures 522 may be round holes within lower hub flange 524 that accommodate coupling bolts 530. In some embodiments, lower hub fitting 520 includes six lower hub fitting bolt apertures 522 at sixty degrees spacing that align with bolt apertures 124 of hollow hub area 120. Other embodiments may have additional or fewer lower hub fitting bolt apertures 522 with any other appropriate spacing.

Lower hub flange 524 can be generally circular in shape and provide for a stable surface in which to contact hollow hub area 120 and accommodate coupling bolts 530 as coupling bolts 530 couple hollow multi-blade rotor 100 to a motor. As illustrated in FIGS. 5A, 5E, and 5F, lower hub flange 524 is coupled to and is coaxial with lower hub tubular member 526. In some embodiments, lower hub flange 524 has a larger overall diameter than lower hub tubular member 526. In some embodiments, lower hub flange 524 and lower hub tubular member 526 are a single unit (e.g., lower hub flange 524 and lower hub tubular member 526 are formed as a single piece using die casting or similar techniques like). In other embodiments, lower hub flange 524 and lower hub tubular member 526 are separate components that are coupled together (e.g., via welding). In some embodiments, lower hub tubular member 526 has a flat outer surface with a sloped edge 540 around the perimeter of lower hub flange 524. Sloped edge 540 may allow for better aerodynamics as hollow multi-blade rotor 100 rotates. In some embodiments, lower hub fitting 520 may include an aperture (not illustrated) in the center of lower hub flange 524 that is coaxial with lower hub flange 524 and lower hub tubular member 526.

Lower hub tubular member 526 is generally tubular in shape as illustrated in FIGS. 5E and 5F. Lower hub tubular member 526 includes an end portion 527 that is on an opposite end of lower hub tubular member 526 from where lower hub tubular member 526 connects to lower hub flange 524. End portion 527 has an outer diameter 529B that is configured to fit inside the inner diameter 519B of end portion 517 of upper hub tubular member 516. Lower hub tubular member 526 also includes a circular ledge 528 that is a certain distance from end portion 527. The distance of the circular ledge 528 from the end portion 527 can vary based on the application requirements. Circular ledge 528 is external to lower hub tubular member 526 as illustrated and has an outer diameter 529A that is less than outer diameter 529B of end portion 527.

Coupling bolts 530 are any appropriate bolts of any appropriate size for coupling hollow multi-blade rotor 100 to a motor. In some embodiments, hollow multi-blade rotor 100 utilizes six coupling bolts 530 as illustrated. Other embodiments may include fewer or more coupling bolts 530. In general, each coupling bolt 530 passes through upper hub fitting 510, hollow hub area 120, and lower hub fitting 520 before coupling to threads of a motor (not illustrated).

In operation, hub system 500 prevents deformation or collapse of hollow hub area 120 when coupling bolts 530 are used to couple hollow multi-blade rotor 100 to a motor. To do so, upper hub tubular member 516 of upper hub fitting 510 is placed into main hub aperture 122 of hollow hub area 120 so that an underside of upper hub flange 514 contacts outside portion 511 of hollow hub area 120. Next, lower hub tubular member 526 of lower hub fitting 520 is placed into main hub aperture 122 of hollow hub area 120 so that an underside of lower hub flange 524 contacts inside portion 521 of hollow hub area 120. As illustrated in FIG. 5G, when both upper hub fitting 510 and lower hub fitting 520 are fully inserted into main hub aperture 122, ledge 528 of lower hub fitting 520 contacts end portion 517 of upper hub tubular member 516 as coupling bolts 530 are tightened. Because upper hub fitting 510 and lower hub fitting 520 are rigid and are in contact with each other, hollow hub area 120 is prevented from being deformed when coupling bolts 530 are used to couple hollow multi-blade rotor 100 to a motor.

While FIG. 5G illustrates ledge 528 of lower hub fitting 520 contacting end portion 517 of upper hub tubular member 516 as coupling bolts 530 are tightened, other embodiments may have alternate dimensions so that ledge 518 of upper hub fitting 510 additionally or alternatively contacts end portion 527 of lower hub fitting 520 as coupling bolts 530 are tightened. In still other embodiments, ledges 518 and 528 may be eliminated altogether (i.e., upper hub tubular member 516 and lower hub tubular member 526 may have constant diameters along their entire lengths). In these embodiments, the ends of upper hub tubular member 516 and lower hub tubular member 526 may simply contact each other in order to prevent deformation or collapse of hollow hub area 120 when coupling bolts 530 are used to coupled hollow multi-blade rotor 100 to a motor.

Figure 6A:
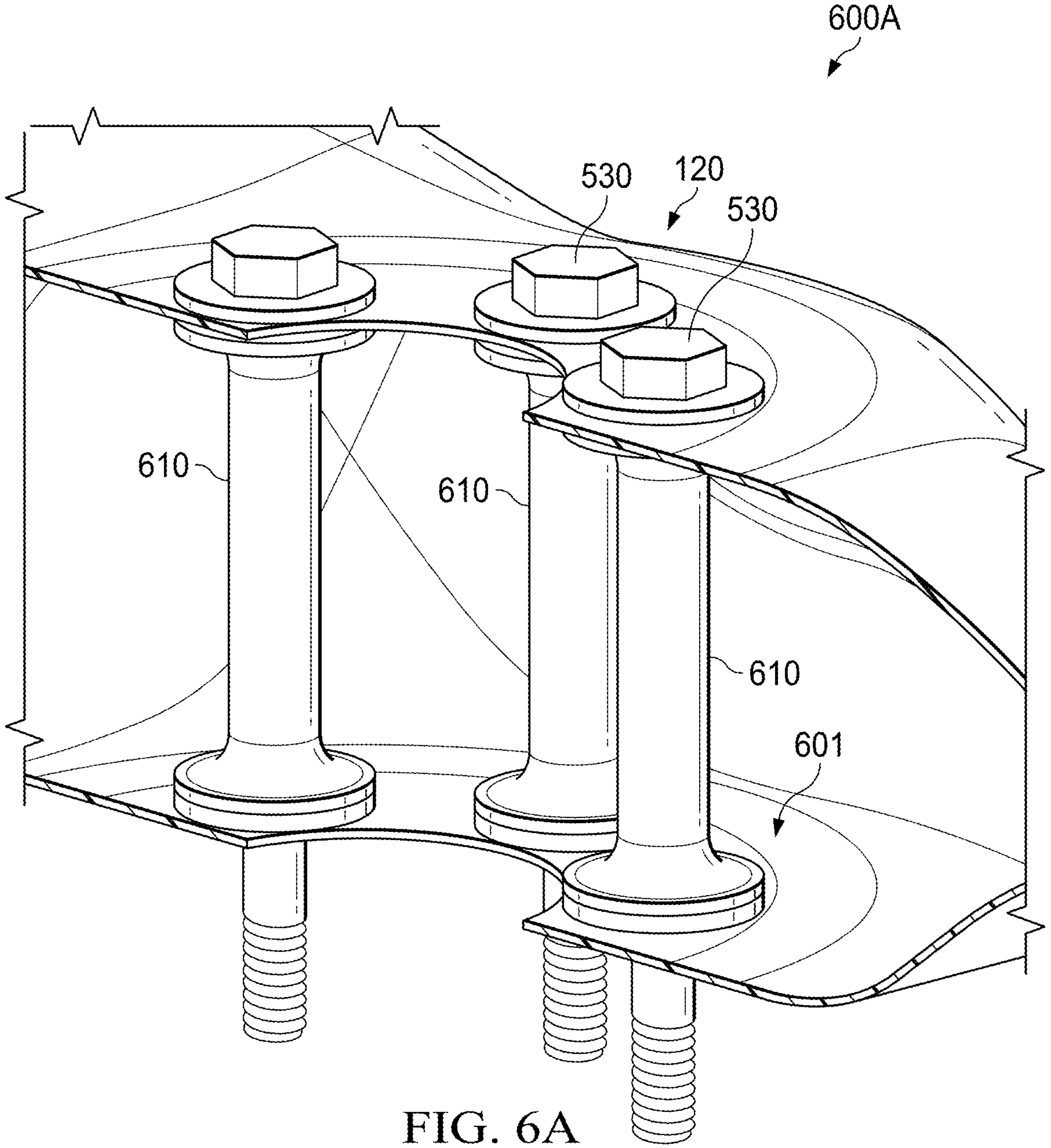
FIGS. 6A-6D illustrate alternate systems for coupling a hollow multi-blade rotor to a motor, according to certain embodiments.

FIGS. 6A-6D illustrate alternate systems 600A-600D for coupling a hollow multi-blade rotor to a motor, according to certain embodiments. FIG. 6A illustrates a system 600A that includes internal members 610 for coupling hollow multi-blade rotor 100 to a motor. In this embodiment, an internal member 610 is provided for each coupling bolt 530. Each internal member 610 is hollow to allow a respective coupling bolt 530 to pass through. Each internal member may also include a flange or flair at each end as illustrated. Each end of each internal member 610 contacts an inside surface 601 of hollow hub area 120. Internal members 610 are made of a rigid material (e.g., metal) and are therefore able to absorb the loads generated by the tightening of coupling bolts 530, thereby preventing deformation or collapse of hollow hub area 120 when coupling bolts 530 are used to coupled hollow multi-blade rotor 100 to a motor.

Figure 6B:
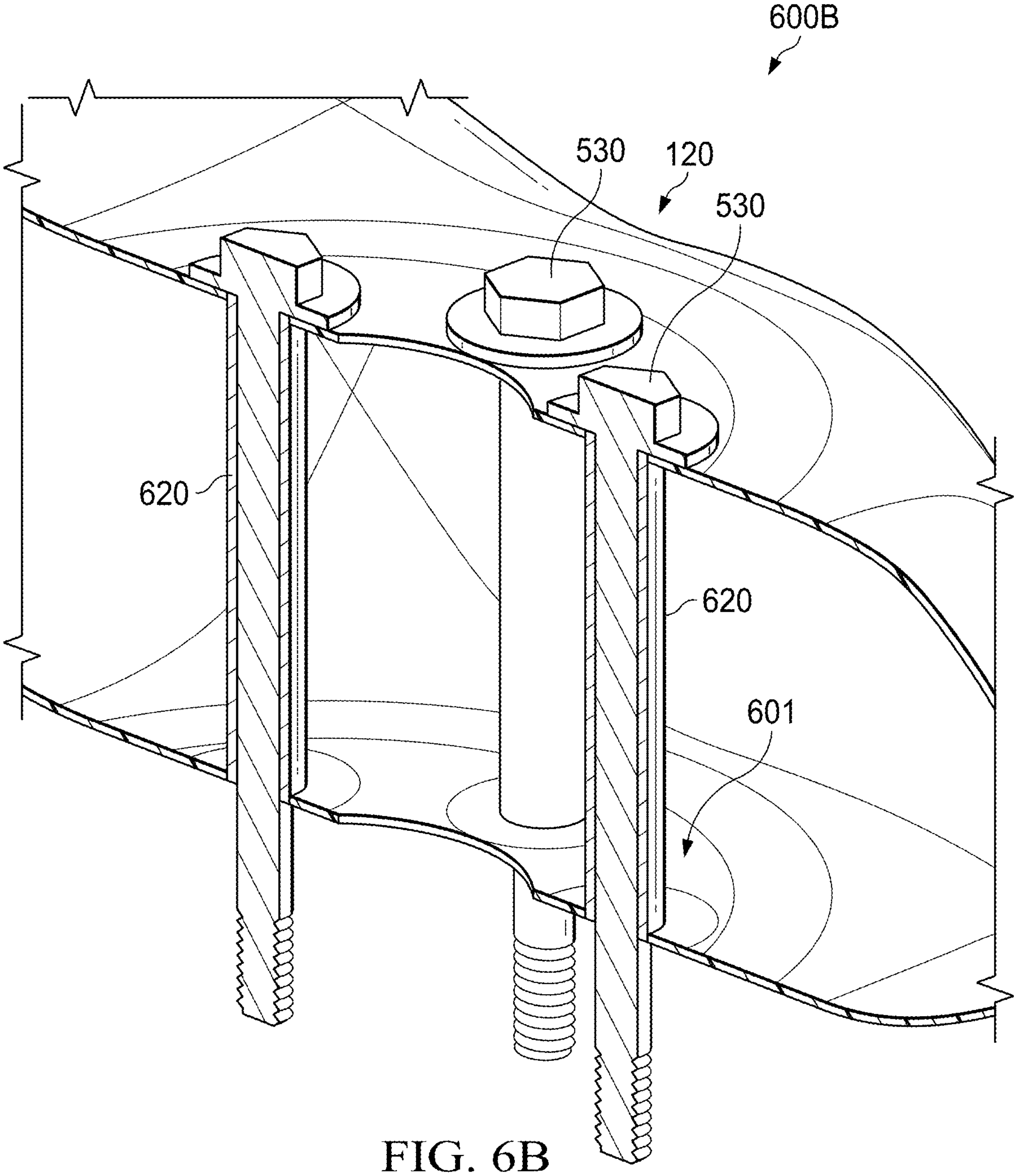

FIG. 6B illustrates a system 600B that includes internal members 620 for coupling hollow multi-blade rotor 100 to a motor. In this embodiment, an internal member 620 is provided for each coupling bolt 530. Each internal member 620 is hollow to allow a respective coupling bolt 530 to pass through. Unlike system 600A of the previous figure, each end of each internal member 610 passes through a respective bolt aperture 124 and contacts an underside of a respective coupling bolt 530. Internal members 620 are made of a rigid material (e.g., metal) and are therefore able to absorb the loads generated by the tightening of coupling bolts 530, thereby preventing deformation or collapse of hollow hub area 120 when coupling bolts 530 are used to coupled hollow multi-blade rotor 100 to a motor.

Figure 6C:
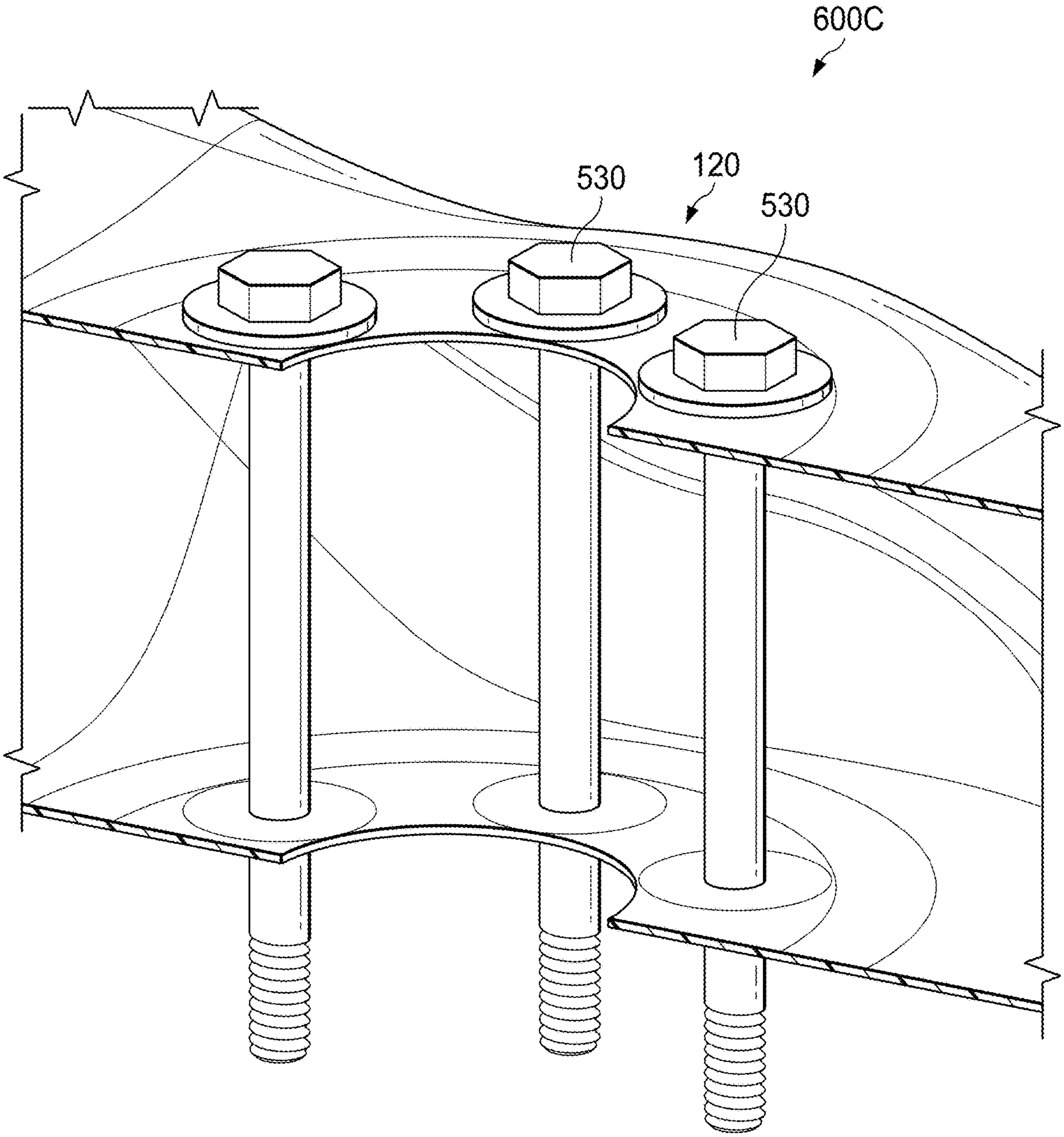

FIG. 6C illustrates a system 600C that eliminates any internal members or sleeves for coupling hollow multi-blade rotor 100 to a motor. In this embodiment, coupling bolts 530 are simply passed through bolt apertures 124 of both sides of hollow hub area 120 and into threads of a motor. To prevent deformation of hollow hub area 120, coupling bolts 530 are monitored and only tightened to a predetermined torque in order to prevent deformation or collapse of hollow hub area 120 when coupling bolts 530 are used to coupled hollow multi-blade rotor 100 to a motor.

Figure 6D:
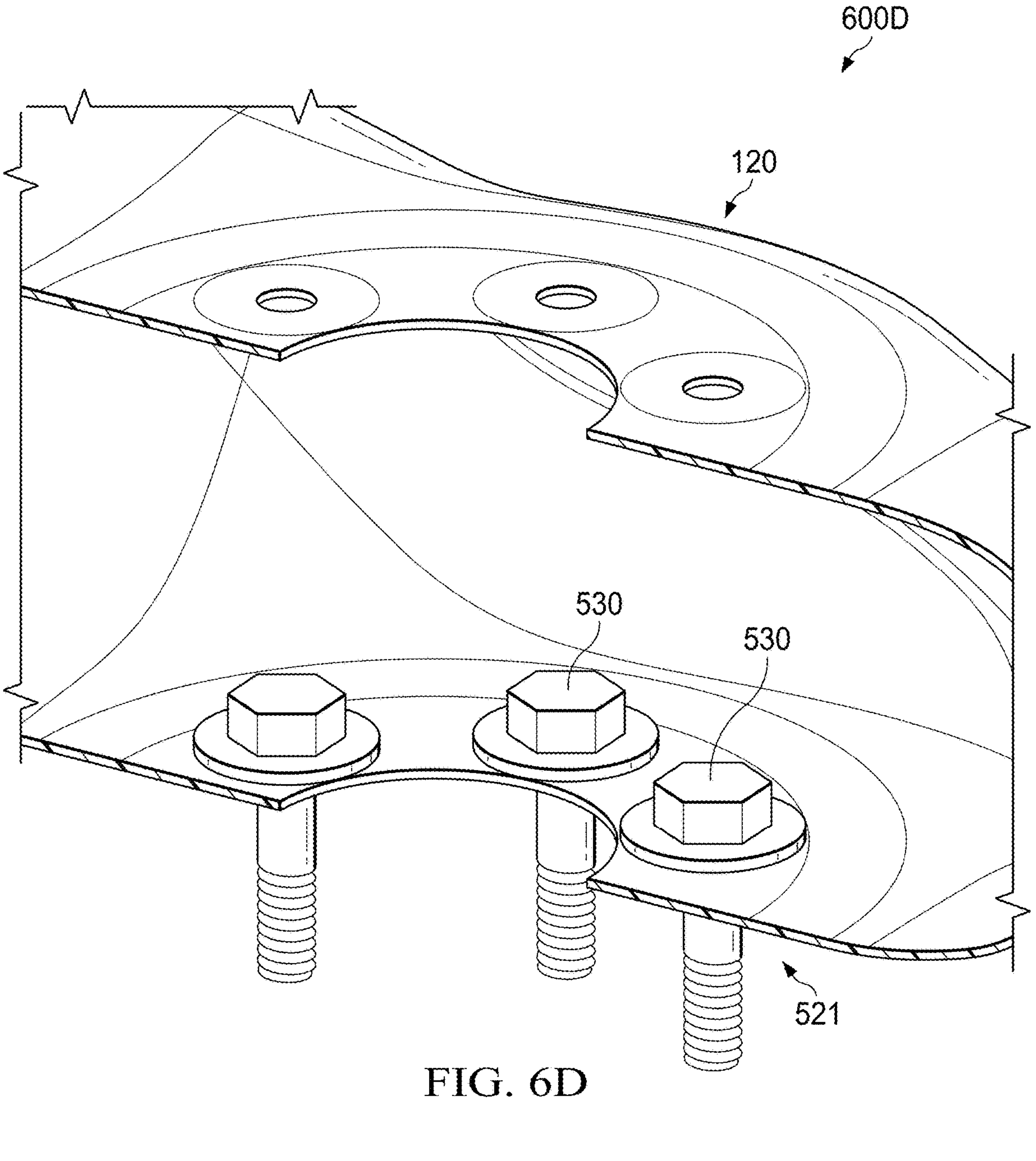

FIG. 6D illustrates a system 600D that eliminates any internal members or sleeves for coupling hollow multi-blade rotor 100 to a motor. Unlike the previous figure, however, coupling bolts 530 are only passed through bolt apertures 124 of inside portion 521 of hollow hub area 120 and into threads of a motor. This prevents deformation of hollow hub area 120 since coupling bolts 530 only pass through one surface of hollow hub area 120.

Figure 7:
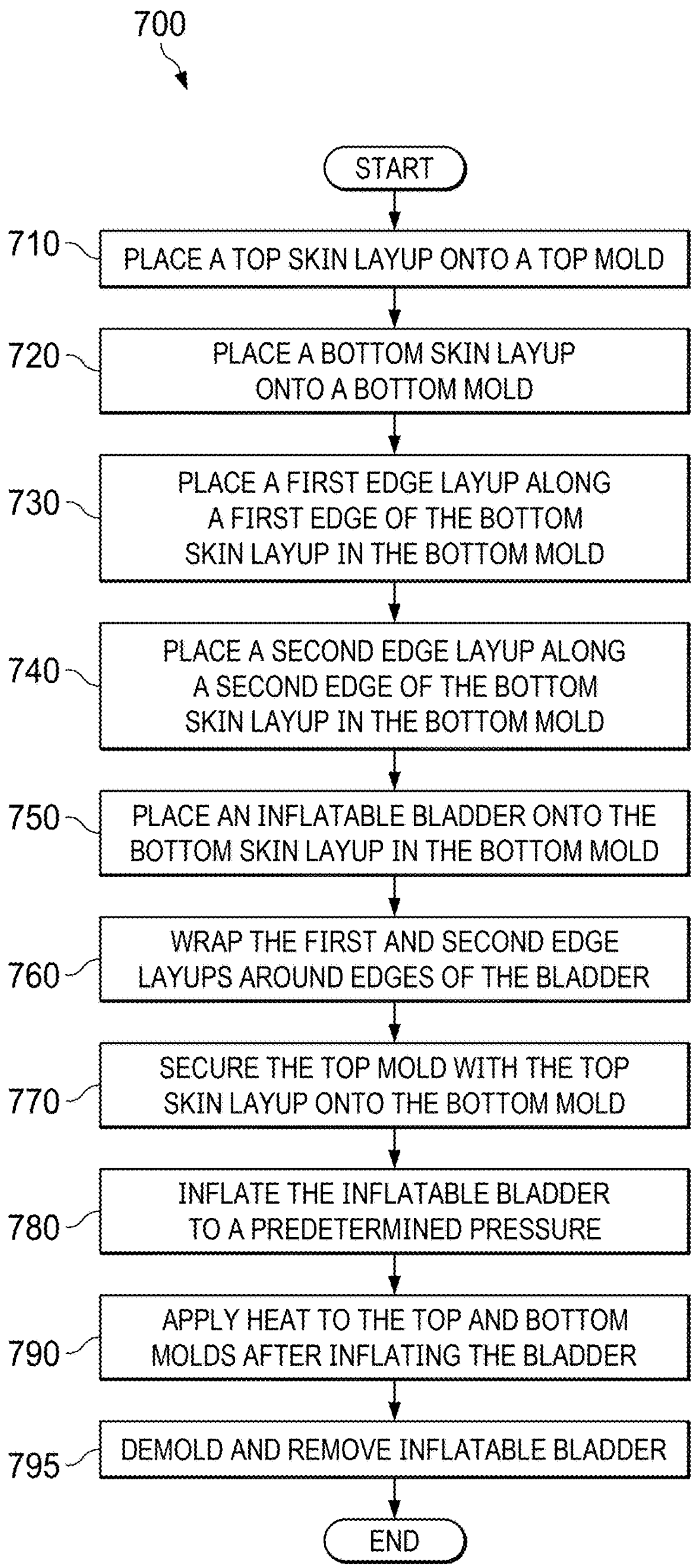
FIG. 7 is a flow diagram of a method of manufacturing a hollow multi-blade rotor, according to certain embodiments.

FIG. 7 is a flow diagram of a method 700 of manufacturing a hollow multi-blade rotor, according to certain embodiments. In some embodiments, method 700 may be used to manufacture hollow multi-blade rotor 100. In addition to FIG. 7, method 700 will be described below in reference to FIGS. 8-11.

Figure 8:
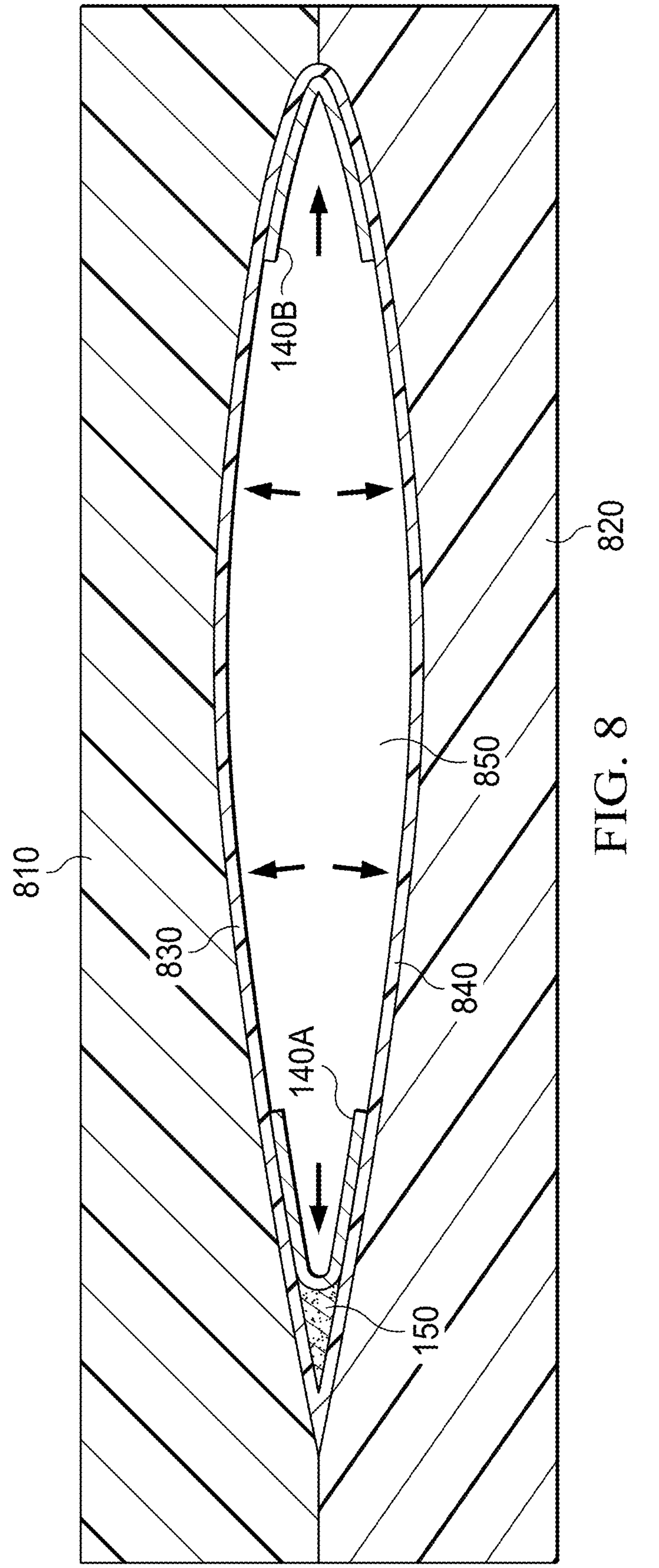
FIG. 8 illustrates a cross sectional view of a hollow multi-blade rotor that may be formed by the method of FIG. 7, according to certain embodiments.
Figure 9:
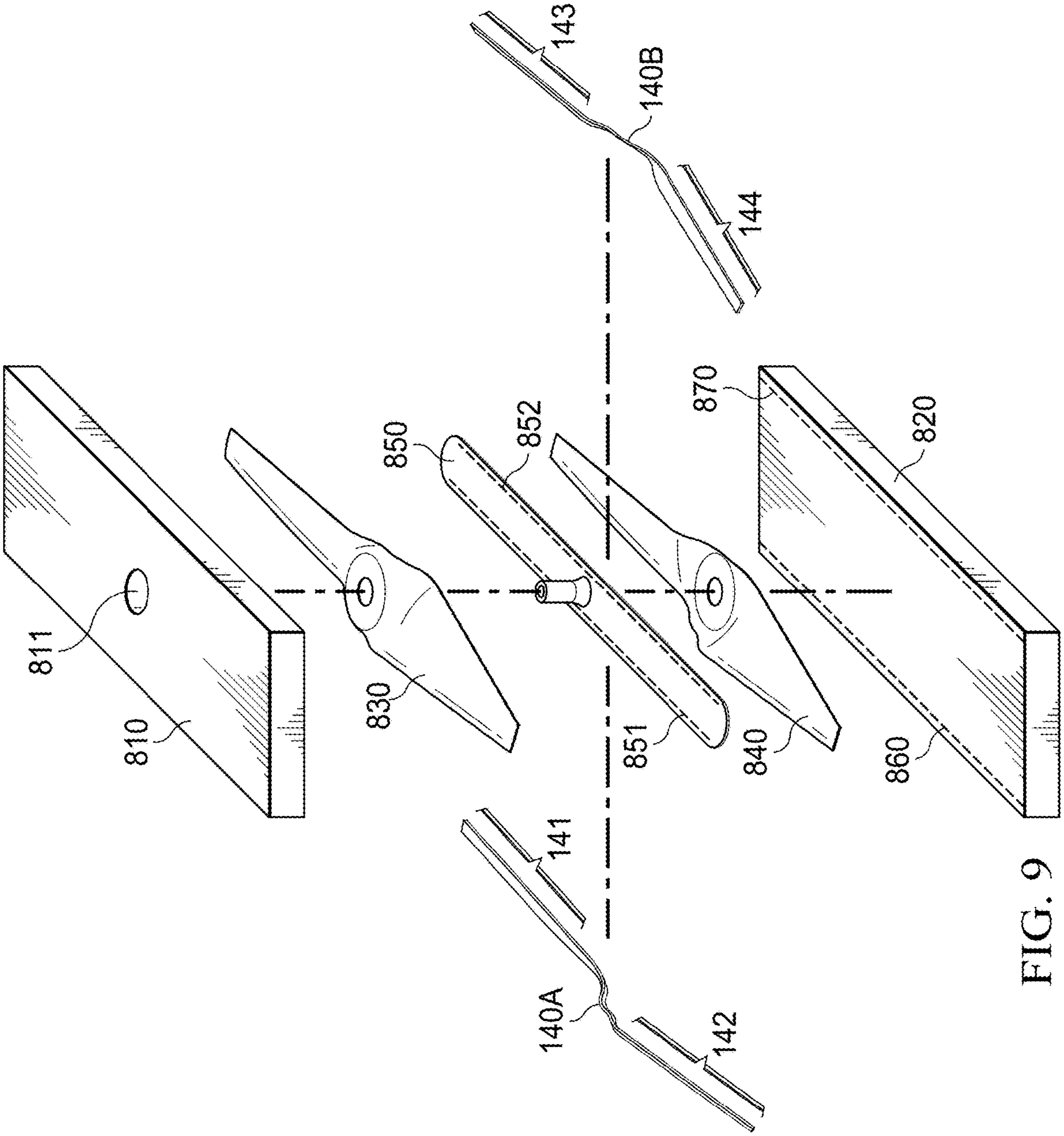
FIGS. 9 and 10 illustrate how a hollow multi-blade rotor may be formed by the method of FIG. 7, according to certain embodiments.

In general, and in reference to FIGS. 8 and 9, method 700 utilizes molds (e.g., a top mold 810 and a bottom mold 820) along with an inflatable bladder (e.g., inflatable bladder 850) to manufacture a hollow multi-blade rotor such as hollow multi-blade rotor 100. Skin layups are first placed into the molds (e.g., a top skin layup 830 is placed into top mold 810 and a bottom skin layup 840 is placed into bottom mold 820). Edge layups such as edge layups 140A and 140B may then be placed on bottom skin layup 840 in bottom mold 820. Inflatable bladder 850 is then placed between the skin layups and the molds are then fastened together. Inflatable bladder 850 is then inflated and the entire system is heated (e.g., in an oven or autoclave) in order to cure the skin layups. Once cured, inflatable bladder 850 and the molds are removed, thereby leaving a hollow multi-blade rotor.

In some embodiments, inflatable bladder 850 can be wrapped on a solid foam or soluble mandrel that can be removed together with the bladder after cure. Ply can be added on inflatable bladder 850 in some embodiment (i.e., not only on the tool).

Returning to FIG. 7, in step 710, a top skin layup is placed onto a top mold. In some embodiments, the top skin layup is top skin layup 830 and the top mold is top mold 810. The top skin layup may be formed from carbon fiber or a carbon fiber composite and may be in a shape of a top side of the hollow multi-blade rotor. For example, the top skin layup may be in a shape of the top of two hollow blades 110 (e.g., 110A and 110B) with a hollow hub area 120 between the two hollow blades 110 as illustrated in FIGS. 1A-1B.

In step 720, a bottom skin layup is placed onto a bottom mold. In some embodiments, the bottom skin layup is bottom skin layup 840 and the bottom mold is bottom mold 820. The bottom skin layup may be formed from carbon fiber or a carbon fiber composite and may be in a shape of a bottom side of the hollow multi-blade rotor. For example, the bottom skin layup may be in a shape of the bottom of two hollow blades 110 (e.g., 110A and 110B) with a hollow hub area 120 between the two hollow blades 110 as illustrated in FIGS. 1A-1B.

In step 730, a first edge layup is placed along a first edge of the bottom skin layup in the bottom mold. For example, as illustrated in FIG. 9, edge layup 140A may be placed along first edge 860 of bottom mold 820. First edge 860 may correspond to edges of hollow blades 110. For example, first edge 860 may correspond to a leading edge 410 of a first hollow blade 110 and a trailing edge 420 of a second hollow blade 110. In some embodiments, first edge layup 140A may be a continuous narrow strip (i.e., a single piece) of carbon fiber or carbon fiber composite material that includes a first end portion 141 that corresponds to a leading edge 410 of a first hollow blade 110 and a second end portion 142 that corresponds to a trailing edge 420 of a second hollow blade 110.

In step 740, a second edge layup is placed along a second edge of the bottom skin layup in the bottom mold. For example, as illustrated in FIG. 9, edge layup 140B may be placed along second edge 870 of bottom mold 820. Second edge 870 may correspond to edges of hollow blades 110. For example, second edge 870 may correspond to a trailing edge 420 of a first hollow blade 110 and a leading edge 410 of a second hollow blade 110. In some embodiments, second edge layup 140B may be a continuous narrow strip (i.e., a single piece) of carbon fiber or carbon fiber composite material that includes a first end portion 143 that corresponds to a trailing edge 420 of a first hollow blade 110 and a second end portion 144 that corresponds to a leading edge 410 of a second hollow blade 110.

In step 750, an inflatable bladder 850 is placed onto the bottom skin layup 840 in bottom mold 820. In some embodiments, inflatable bladder 850 is constructed as explained in more detail below in reference to FIG. 12. In other embodiments, inflatable bladder 850 can be manufactured using other techniques (e.g., a reusable latex or silicone bladder.) After inflatable bladder 850 is placed onto the bottom skin layup 840 in the bottom mold 820 in step 750, step 760 may be performed. In step 760, edge layups 140A and 140B are wrapped around edges of inflatable bladder 850. For example, first edge layup 140A may be wrapped around a first edge 851 of inflatable bladder 850 and second edge layup 140B may be wrapped around a second edge 852 of inflatable bladder 850. FIG. 8 illustrates how each edge layup 140 has been wrapped around a respective edge of inflatable bladder 850.

Figure 10:
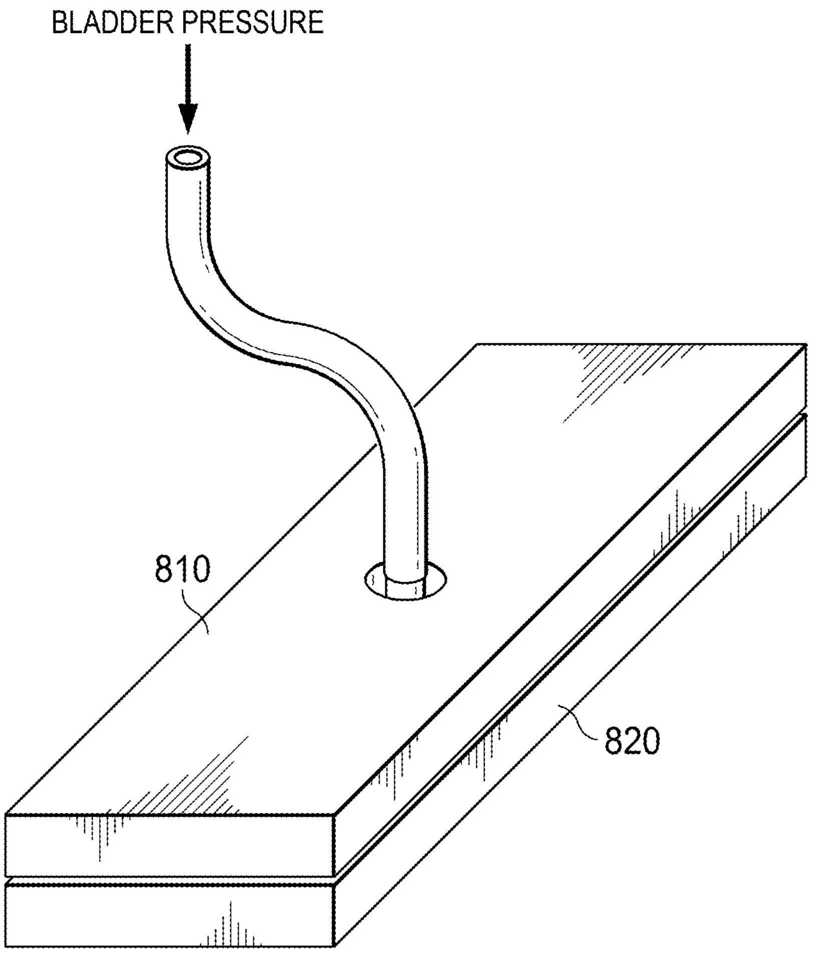

In step 770, top mold 810 that includes top skin layup 830 is secured onto bottom mold 820 as illustrated in FIG. 10. In some embodiments, top mold 810 and bottom mold 820 are secured together with bolts as illustrated in FIG. 13C. In other embodiments, top mold 810 and bottom mold 820 are secured together using any other appropriate mechanism.

In step 780, inflatable bladder 850 is inflated to a predetermined pressure after top mold 810 is secured to bottom mold 820 as illustrated in FIG. 10. In some embodiments, the predetermined pressure is between 50-55 psi. In some embodiments, inflatable bladder 850 is inflated using compressed air, nitrogen, or any other appropriate gas. In some embodiments, inflatable bladder 850 is inflated using a pressure port 1230 that is affixed to inflatable bladder 850 and protrudes through a central aperture 811 of top mold 810.

In step 790, heat is applied to the coupled top and bottom molds 810 and 820 after inflatable bladder 850 has been inflated. In some embodiments, step 790 includes placing the coupled top and bottom molds 810 and 820 into an oven or an autoclave. In some embodiments, step 790 includes utilizing one or more electric heating elements that are coupled to or embedded within one or both of top mold 810 and bottom mold 820. Step 790 cures top skin layup 830 and bottom skin layup 840, thereby forming a hollow multi-blade rotor. After step 790, method 700 may end.

In some embodiments, method 700 may additionally include deflating inflatable bladder 850 after step 790. In some embodiments, this may include using the pressure port that is affixed to inflatable bladder 850 and protrudes through a central aperture 811 of top mold 810. After inflatable bladder 850 has be deflated, method 700 may also include removing the deflated inflatable bladder 850 in step 795 through main hub aperture 122 (i.e., after one or both of the top and bottom molds are removed). In alternate embodiments, central aperture 811 may be included in bottom mold 820 instead of top mold 810.

Figure 11:
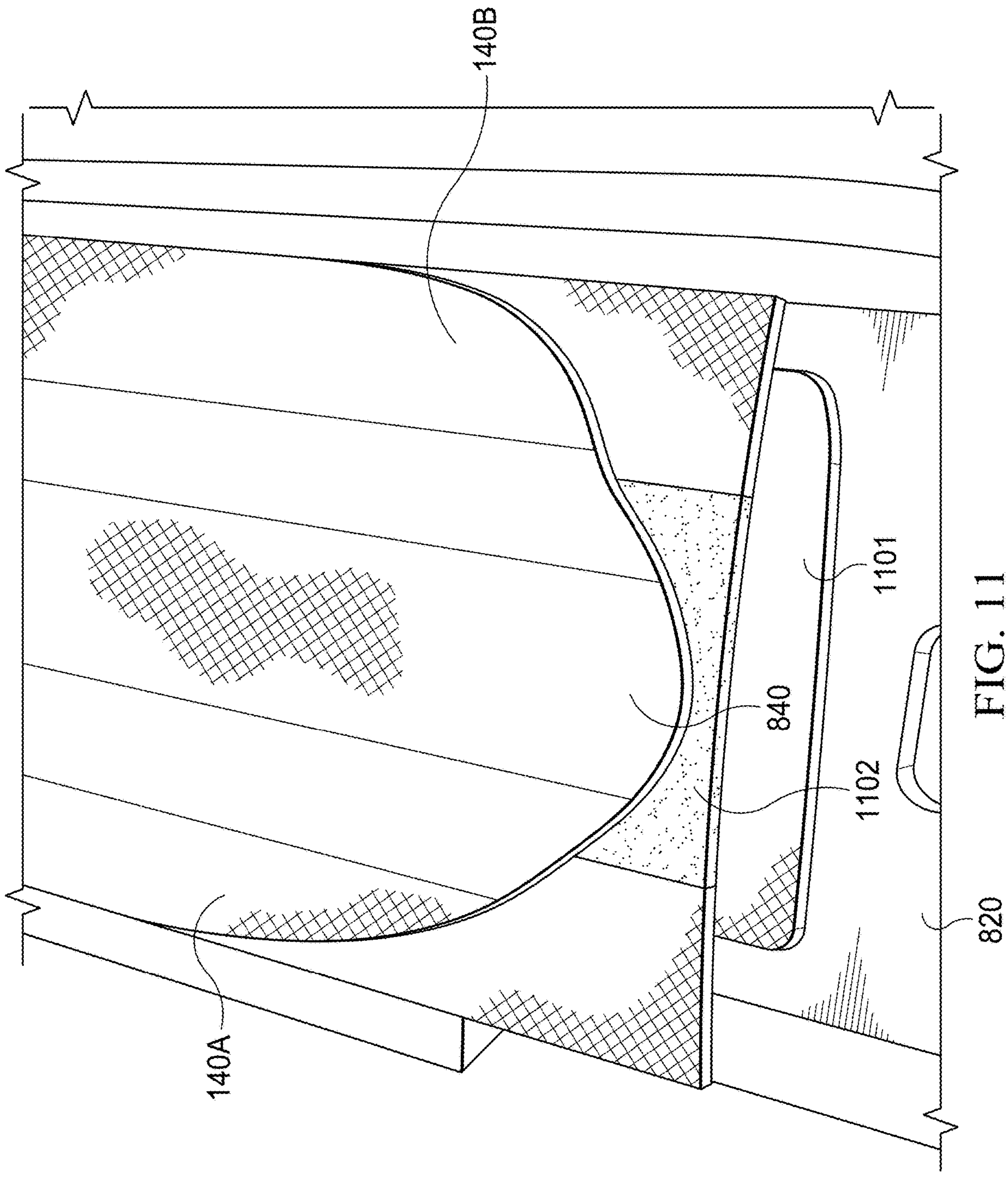
FIG. 11 illustrates additional component that may be used by the method of FIG. 7 to form a hollow multi-blade rotor, according to certain embodiments.

In some embodiments, method 700 may include adding additional components to strengthen the edges and tips of hollow multi-blade rotor 100. For example, FIG. 11 illustrates that addition of a tip preform 1101 and an epoxy adhesive filler 1102. Tip preform 1101 (also known in the industry as a “noodle”) may be formed from unidirectional fiber-reinforced tape using molds. In these embodiments, tip preform 1101 may be applied directly on top of bottom skin layup 840. Edge layups 140 may then be applied on top of tip preform 1101. Finally, epoxy adhesive filler 1102 may be applied on top of edge layups 140.

In some embodiments, an additional edge preform (“noodle”) may be used as edge filler 150 as illustrated in FIG. 4. The edge preform may be formed from unidirectional fiber-reinforced tape using molds. In these embodiments, the edge preform may be applied directly on top of bottom skin layup 840. An edge layup 140 may then be applied on top of the edge preform. The edge preform (i.e., edge filler 150) fills the gap between the trailing edge of hollow blade 110 and edge layup 140.

Figure 12:
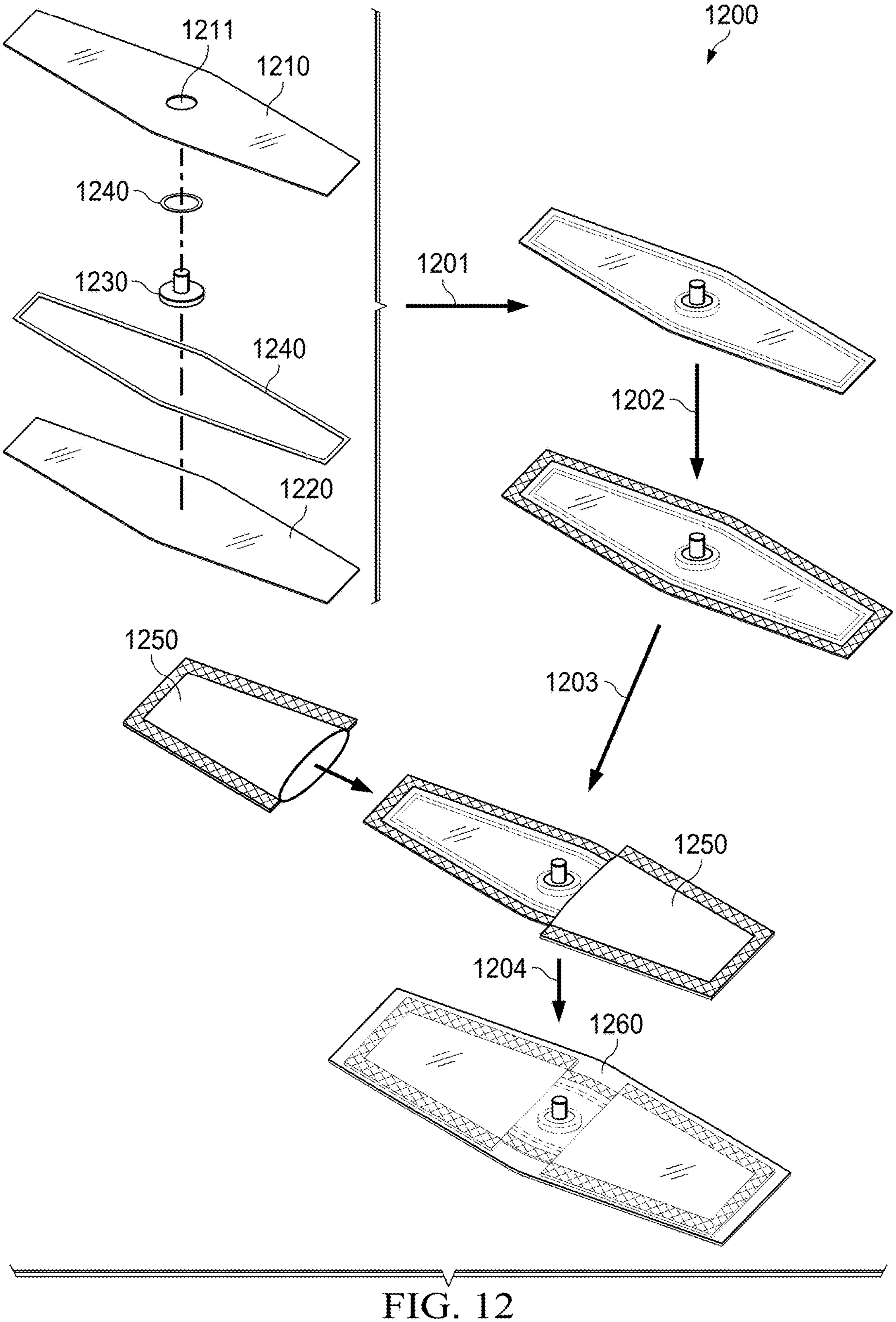
FIG. 12 illustrates a process of assembling an inflatable bladder that may be used to form a hollow multi-blade rotor, according to certain embodiments.

FIG. 12 illustrates an assembly process 1200 for creating inflatable bladder 850, according to certain embodiments. At step 1201, a pressure port 1230 is coupled to an underside of an upper vacuum bag sheet 1210 through a central aperture 1211 using vacuum bag sealant tape 1240. Pressure port 1230 may be, for example, a male quick-release air compressor coupling. Next, vacuum bag sheets (e.g., an upper vacuum bag sheet 1210 and a lower vacuum bag sheet 1220) are coupled together using vacuum bag sealant tape 1240. For example, vacuum bag sealant tape 1240 may be used to couple upper vacuum bag sheet 1210 and lower vacuum bag sheet 1220 together around their outer perimeters. In general, upper vacuum bag sheet 1210 and lower vacuum bag sheet 1220 are each in a shape of a hollow multi-blade rotor such as hollow multi-blade rotor 100. For example, upper vacuum bag sheet 1210 may be in a shape of the top of two hollow blades 110 (e.g., 110A and 110B) with a hollow hub area 120 between the two hollow blades 110 as illustrated in FIGS. 1A-1B. Similarly, lower vacuum bag sheet 1220 may be in a shape of the bottom of two hollow blades 110 (e.g., 110A and 110B) with a hollow hub area 120 between the two hollow blades 110 as illustrated in FIGS. 1A-1B.

At step 1202, the edges of upper vacuum bag sheet 1210 and lower vacuum bag sheet 1220 are sealed together to form an air-tight bond. In some embodiments, the edges of upper vacuum bag sheet 1210 and lower vacuum bag sheet 1220 are sealed together using a plastic heat-sealing machine.

At step 1203, sleeves 1250 are inserted over the sealed upper vacuum bag sheet 1210 and lower vacuum bag sheet 1220. Sleeves 1250 can be formed using the same process and materials as steps 1201 and 1202 except: vacuum bag sealant tape 1240 and pressure port 1230 may be omitted; and vacuum bag sheets 1210 and 1220 may be cut approximately in half to form two sleeves 1250. After step 1203, the sealed vacuum bag sheets 1210 and 1220 and sleeves 1250 may be wrapped completely in release film 1260. Once wrapped in release film 1260, the assembly may be utilized as inflatable bladder 850.

Figure 13A:
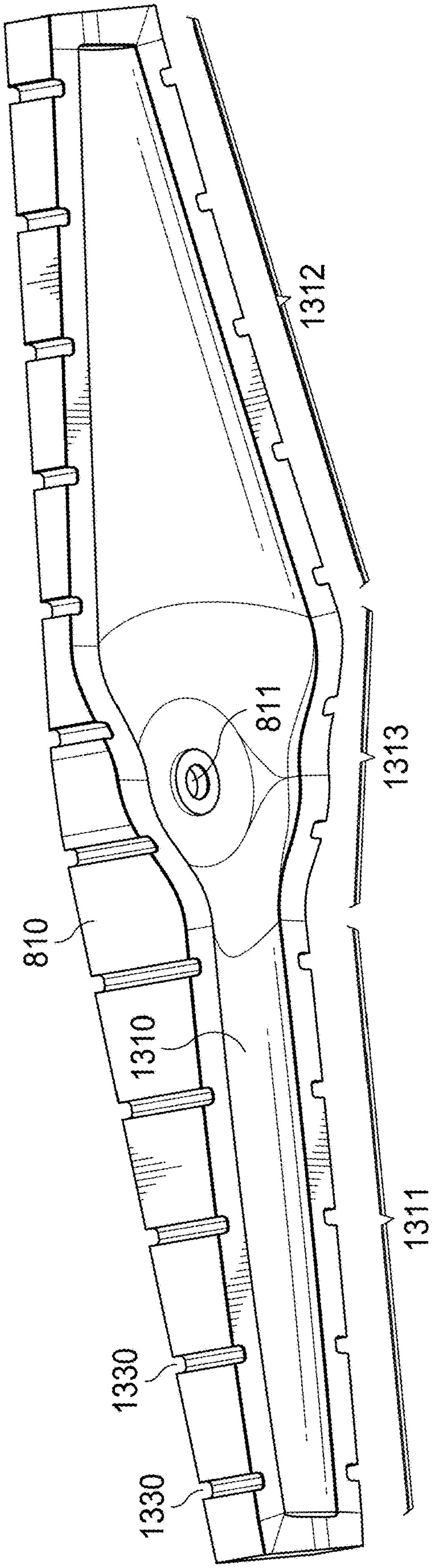
FIGS. 13A-13C illustrate a system that may be used to manufacture a hollow multi-blade rotor, according to certain embodiments.
Figure 13B:
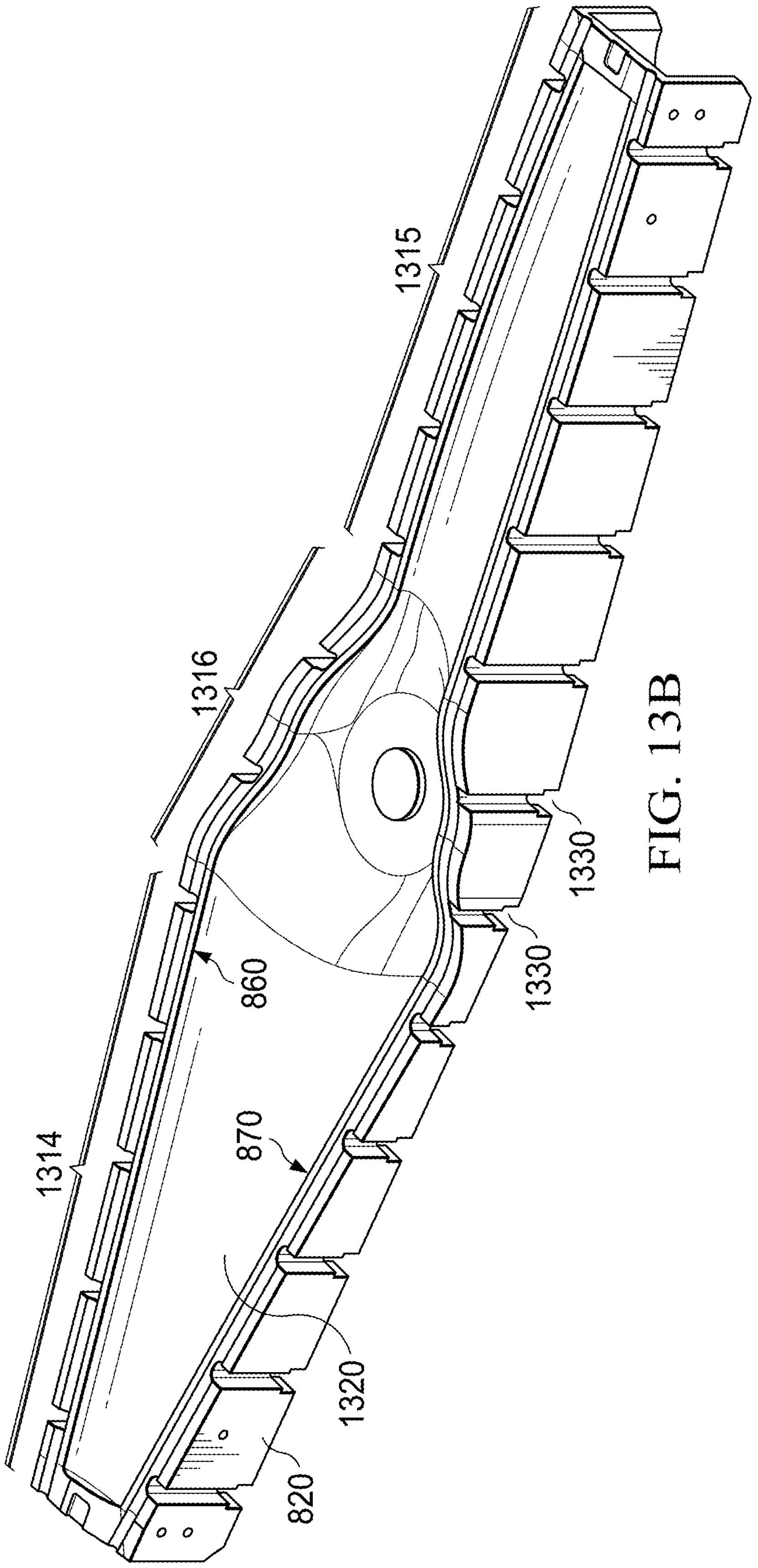
Figure 13C:
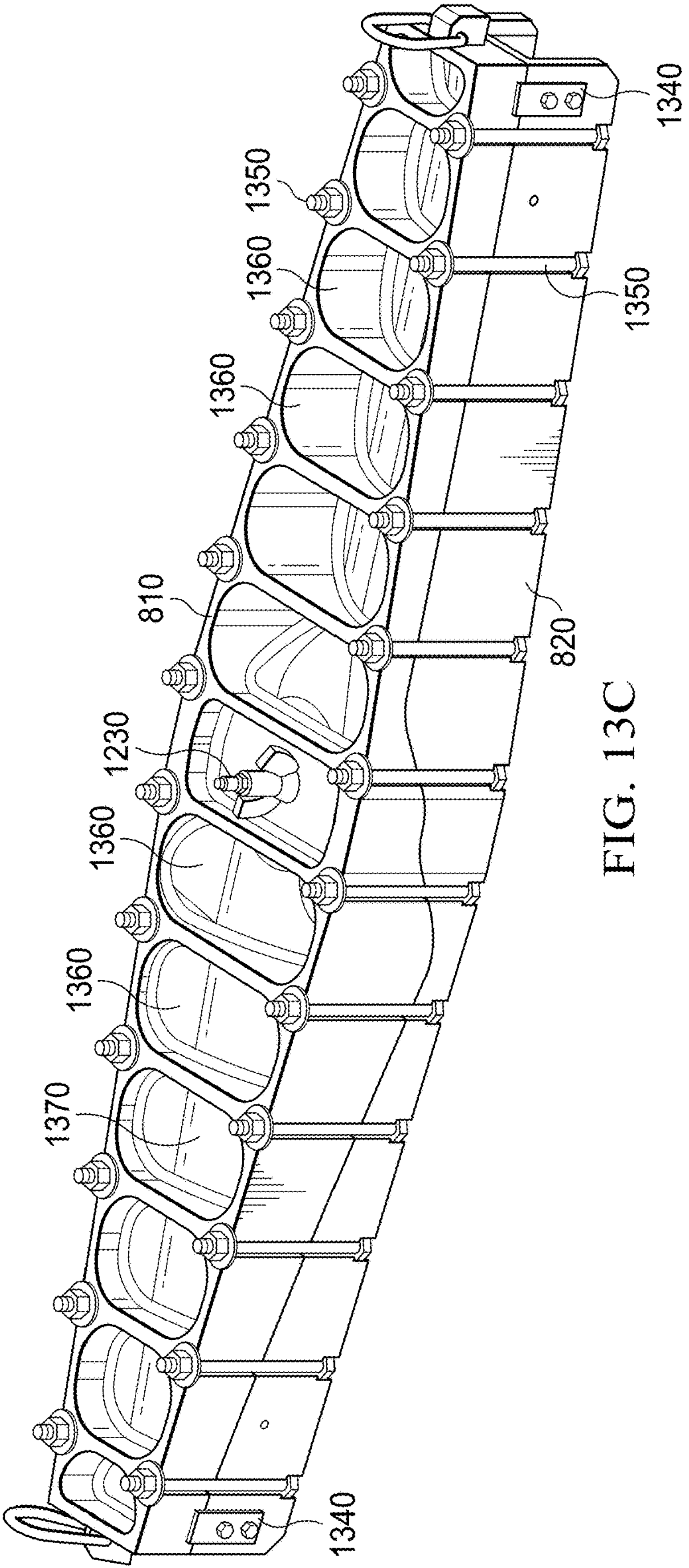

FIGS. 13A-13C illustrate a system 1300 that may be used to manufacture hollow multi-blade rotor 100, according to certain embodiments. System 1300 may include top mold 810 and bottom mold 820. In some embodiments, top mold 810 and bottom mold 820 may be formed from metal (e.g., aluminum, etc.) in order to conduct heat. Top mold 810 includes an upper contoured surface 1310. Upper contoured surface 1310 is a continuous surface for forming a top surface of hollow multi-blade rotor 100. In some embodiments, upper contoured surface 1310 includes a first region 1311, a second region 1312, and a third region 1313. First region 1311 is shaped to form an upper surface of a first hollow blade 110 (i.e., a fixed-pitch hollow blade with a leading edge and a trailing edge). Second region 1312 is shaped to form an upper surface of a second hollow blade 110 (i.e., a fixed-pitch hollow blade with a leading edge and a trailing edge). Third region 1313 is shaped to form an upper surface of hollow hub area 120 and may include a central aperture 1211 as illustrated. Central aperture 1211 may be configured to allow pressure port 1230 of inflatable bladder 850 to protrude out of top mold 810.

In some embodiments, lower contoured surface 1320 includes a fourth region 1314, a fifth region 1315, and a sixth region 1316. Fourth region 1314 is shaped to form a lower upper surface of the first hollow blade 110 (i.e., a fixed-pitch hollow blade with a leading edge and a trailing edge). Fifth region 1315 is shaped to form a lower surface of the second hollow blade 110 (i.e., a fixed-pitch hollow blade with a leading edge and a trailing edge). Sixth region 1316 is shaped to form a lower surface of hollow hub area 120.

In some embodiments, top mold 810 and bottom mold 820 each include a plurality of coupler grooves 1330 as illustrated. Each coupler groove 1330 may be configured to accept a coupling bolt 1350. As illustrated in FIG. 13C, coupling bolts 1350 may be used to secure top mold 810 to bottom mold 820 together during the heating/curing process of hollow multi-blade rotor 100. In some embodiments, coupler grooves 1330 are arranged around perimeters of top mold 810 and bottom mold 820 as illustrated. Coupler grooves 1330 of top mold 810 are aligned with coupler grooves 1330 of bottom mold 820 when top mold 810 is placed on bottom mold 820. While a specific number and arrangement of coupler grooves 1330 are illustrated, any appropriate number and arrangement of coupler grooves 1330 may be used.

In some embodiments, system 1300 includes one or more alignment plates 1340 as illustrated in FIG. 13C. Each alignment plate 1340 is configured to attach to one or both of top mold 810 and bottom mold 820 in order to align top mold 810 and bottom mold 820 when the molds are coupled together. In some embodiments, alignment plate 1340 is a thin metal strip that is coupled to bottom mold 820 and protrudes above bottom mold 820 in order to contact and align top mold 810 to bottom mold 820.

In some embodiments, the undersides of top mold 810 and bottom mold 820 each include multiple pockets 1360, as illustrated. Pockets 1360 are cut-away areas of top mold 810 and bottom mold 820 that expose an underside 1370 of upper contoured surface 1310 and an underside of lower contoured surface 1320 (not illustrated) to heat applied to system 1300 (e.g., during curing). Pockets 1360 help reduce the time and energy required to heat system 1300 to a desired temperature during the curing process.

In some embodiments, system 1300 includes one or more electrical heating elements (not illustrated) that may be used to heat system 1300 during the curing process. In some embodiments, the heating elements may be coupled or otherwise attached to an outer surface of one or both of top mold 810 and bottom mold 820. In some embodiments, the heating elements may be embedded within one or both of top mold 810 and bottom mold 820. In addition, some embodiments may include one or more wired or wireless sensors for monitoring the temperature of system 1300 during the curing process. In some embodiments, the sensors may be coupled or otherwise attached to an outer surface of one or both of top mold 810 and bottom mold 820. In some embodiments, the sensors may be embedded within one or both of top mold 810 and bottom mold 820.

Figure 14:
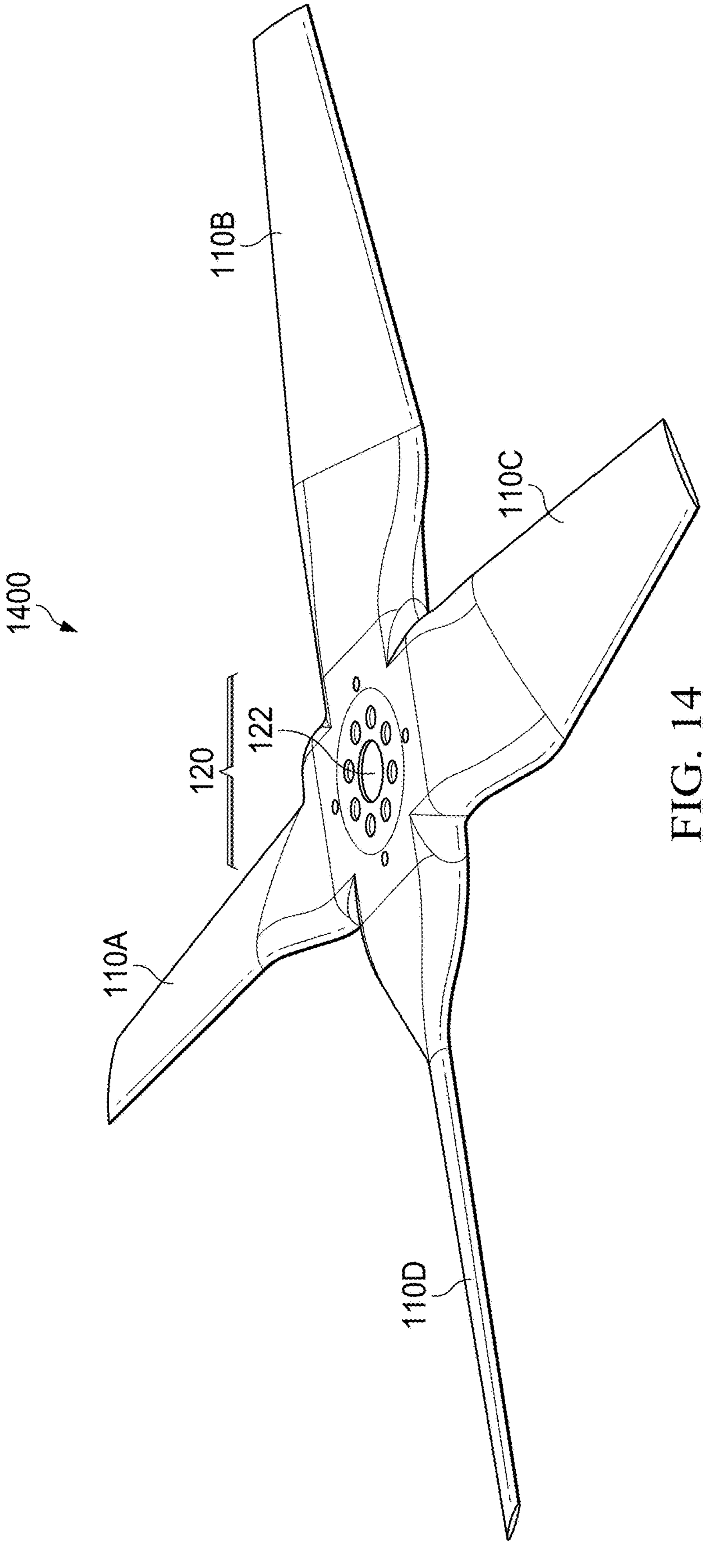
FIG. 14 illustrates a hollow multi-blade rotor having more than two hollow blades, according to certain embodiments.

FIG. 14 illustrates a hollow multi-blade rotor 1400 having more than two hollow blades 110, according to certain embodiments. Hollow multi-blade rotor 1400, like hollow multi-blade rotor 100 in FIG. 1, includes multiple hollow blades 110, a hollow hub area 120, and a main hub aperture 122. In the specific embodiment of FIG. 14, hollow multi-blade rotor 1400 includes four hollow blades 110: 110A-110D. While a specific number of hollow blades 110 are illustrated in FIG. 14, other embodiments of hollow multi-blade rotor 1400 may include any number of hollow blades 110 greater than two (e.g., three, five, six, etc.).

In general, hollow blades 110 of hollow multi-blade rotor 1400 each include an internal hollow cavity 130 as illustrated and described above in reference to FIG. 2. In some embodiments, internal hollow cavities 130 of hollow blades 110A-D of hollow multi-blade rotor 1400 are devoid of filler material (e.g., foam and the like) and instead are filled with air. In some embodiments, hollow blades 110 are formed from carbon fiber composite materials in a layup process as described in above in reference to FIG. 7. In some embodiments, hollow blades 110 include edge layups 140 as illustrated and described above in reference to FIG. 4. In some embodiments, hub system 500 as illustrated and described above in reference to FIGS. 5A-5G may be used to securely couple hollow multi-blade rotor 1400 to a motor while preventing hollow multi-blade rotor 1400 from deforming or collapsing due to hub area 120 being hollow.

Figure 15:
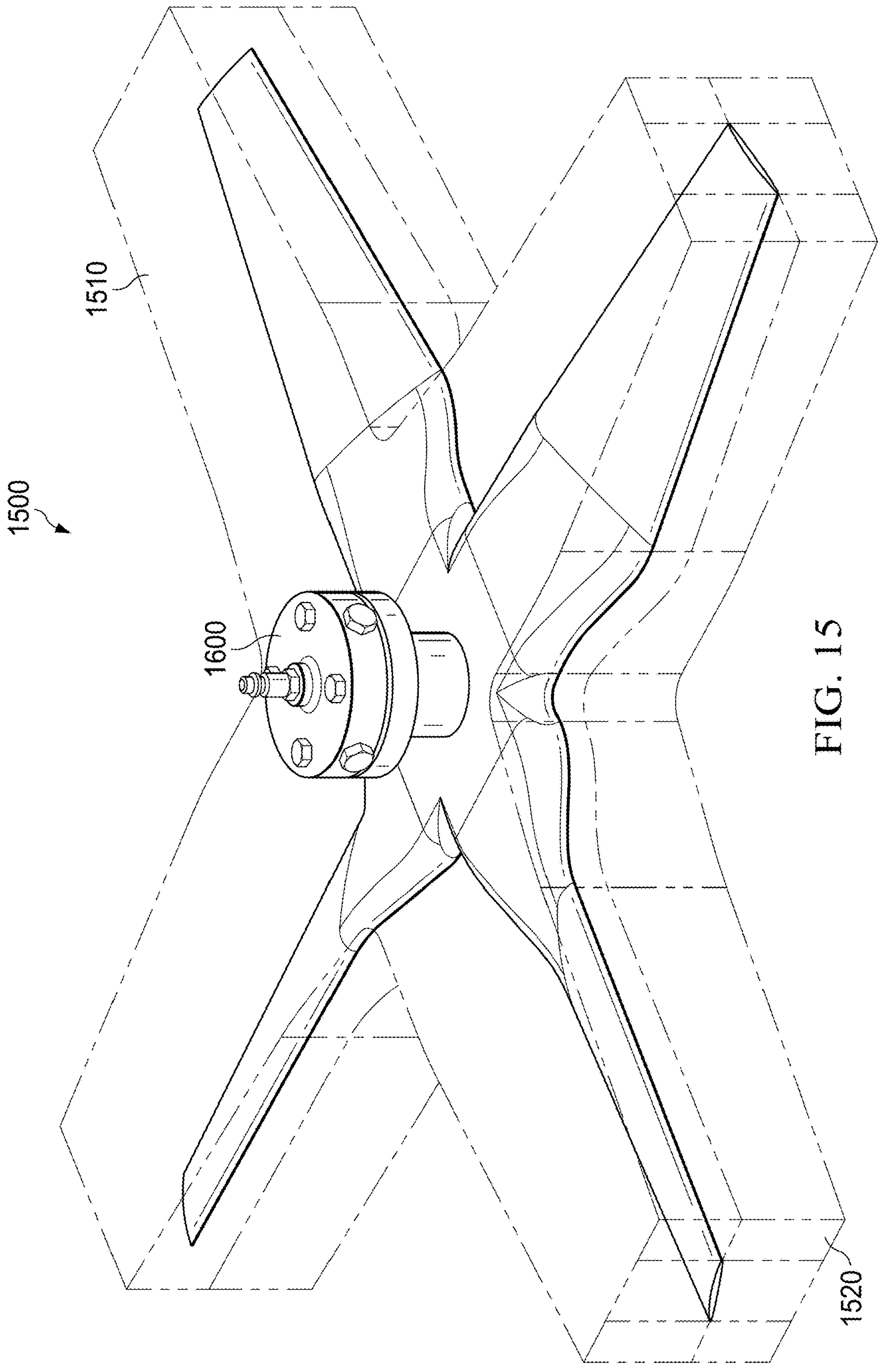
FIG. 15 illustrates a system that may be used to manufacture the hollow multi-blade rotor of FIG. 14, according to certain embodiments.

FIG. 15 illustrates a system 1500 that may be used to manufacture hollow multi-blade rotor 1400, according to certain embodiments. In some embodiments, system 1500 includes a top mold 1510 and a bottom mold 1520. Top mold 1510 functions the same as, and has similar features to, top mold 810 described above. Similarly, bottom mold 1520 functions the same as, and has similar features to, bottom mold 820 described above. However, top mold 1510 and bottom mold 1520 have different shapes from top mold 810 and bottom mold 820 in order to accommodate additional hollow blades 110, as illustrated.

System 1500 also includes a manifold apparatus 1600 for manufacturing hollow multi-blade rotor 1400. In general, manifold apparatus 1600 supports hollow hub area 120 of hollow multi-blade rotor 1400 while hollow multi-blade rotor 1400 is being formed within top mold 1510 and bottom mold 1520. In addition, manifold apparatus 1600 allows for the simultaneous inflation of inflatable bladders 850 within hollow multi-blade rotor 1400 during manufacturing. Particular embodiments of manifold apparatus 1600 are described in more detail below in reference to FIGS. 16-21B, and a method of manufacturing hollow multi-blade rotor 1400 using system 1500 and manifold apparatus 1600 is described in reference to FIG. 22.

Figure 16:
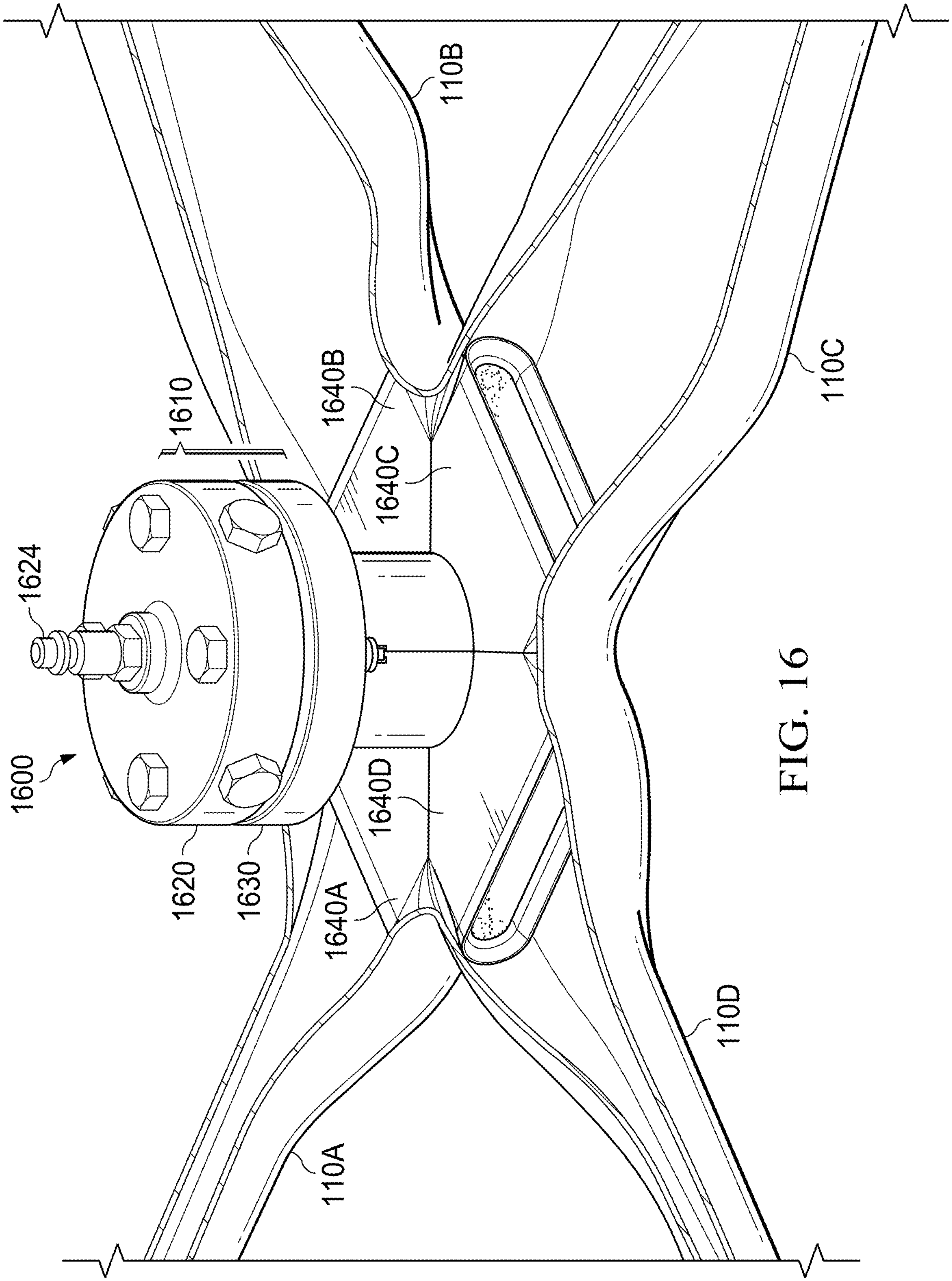
FIG. 16 illustrates a manifold apparatus that may be used by the system of FIG. 15, according to certain embodiments.
Figure 17:
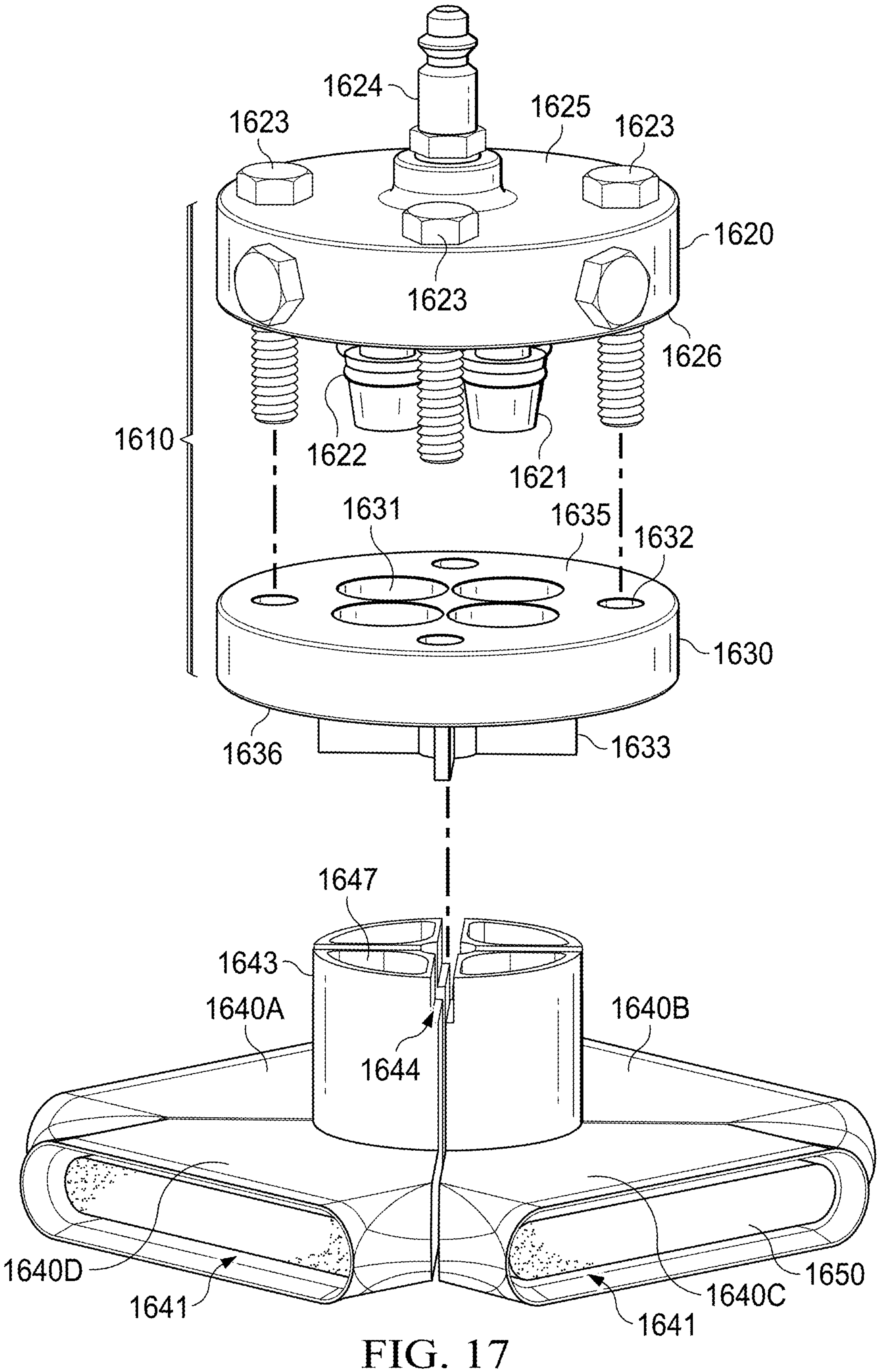
FIG. 17 illustrates an assembly view of the manifold apparatus of FIG. 16, according to certain embodiments.

FIGS. 16-17 illustrate manifold apparatus 1600 that may be used to manufacture hollow multi-blade rotor 1400, according to certain embodiments. FIG. 16 illustrates a cutaway view of hollow multi-blade rotor 1400 in order to show manifold apparatus 1600 during the manufacture of hollow multi-blade rotor 1400, and FIG. 17 illustrates an assembly view of manifold apparatus 1600. In some embodiments, manifold apparatus 1600 includes a manifold 1610 and multiple pressure pads 1640 (e.g., pressure pads 1640A-1640D). Manifold 1610 may include an upper manifold section 1620 and a lower manifold section 1630 that couples to upper manifold section 1620. Upper manifold section 1620, lower manifold section 1630, and pressure pads 1640 are described in more detail below.

Figure 18:
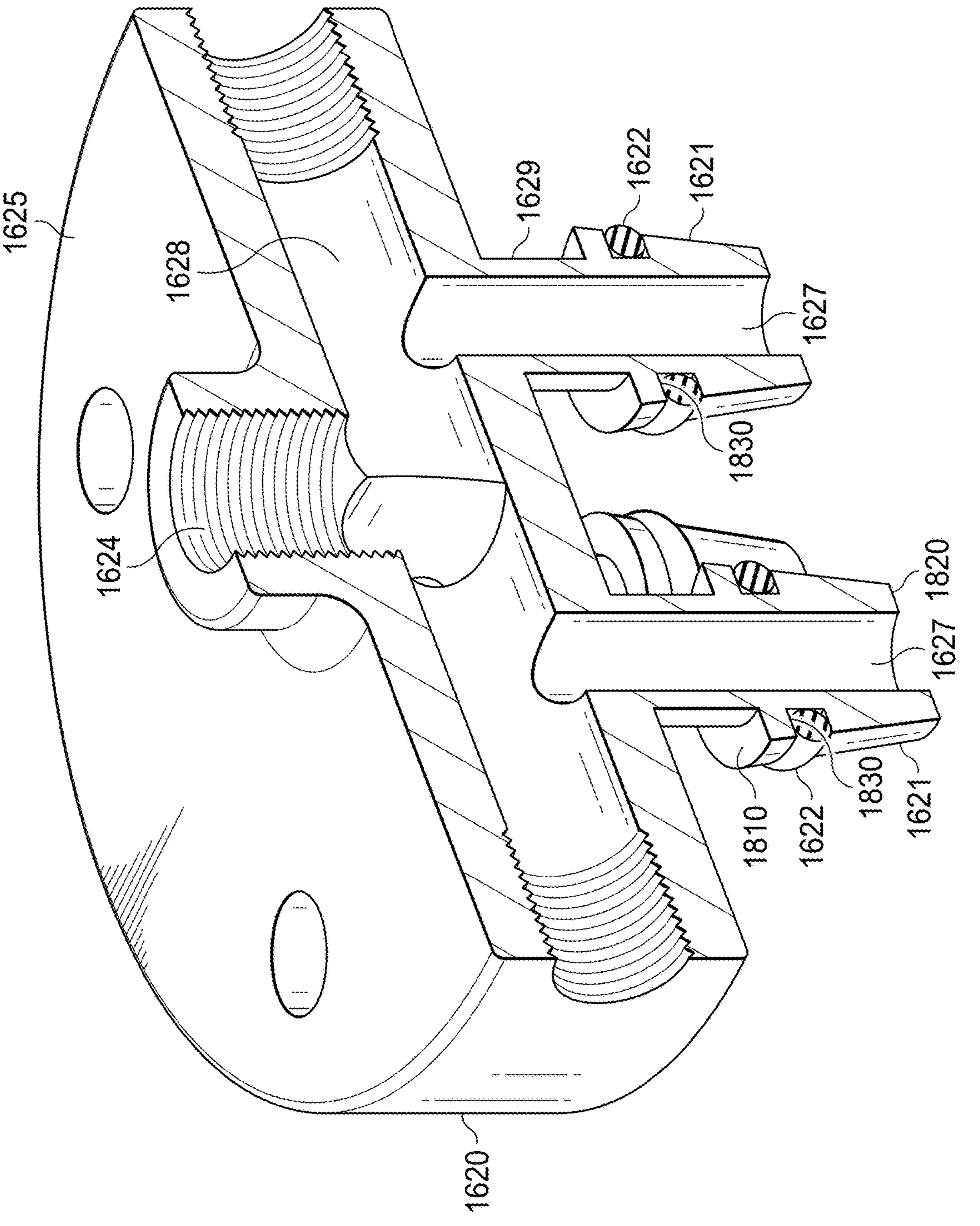
FIGS. 18-19 illustrate various views of an upper manifold section of the manifold apparatus of FIG. 16, according to certain embodiments.
Figure 19:
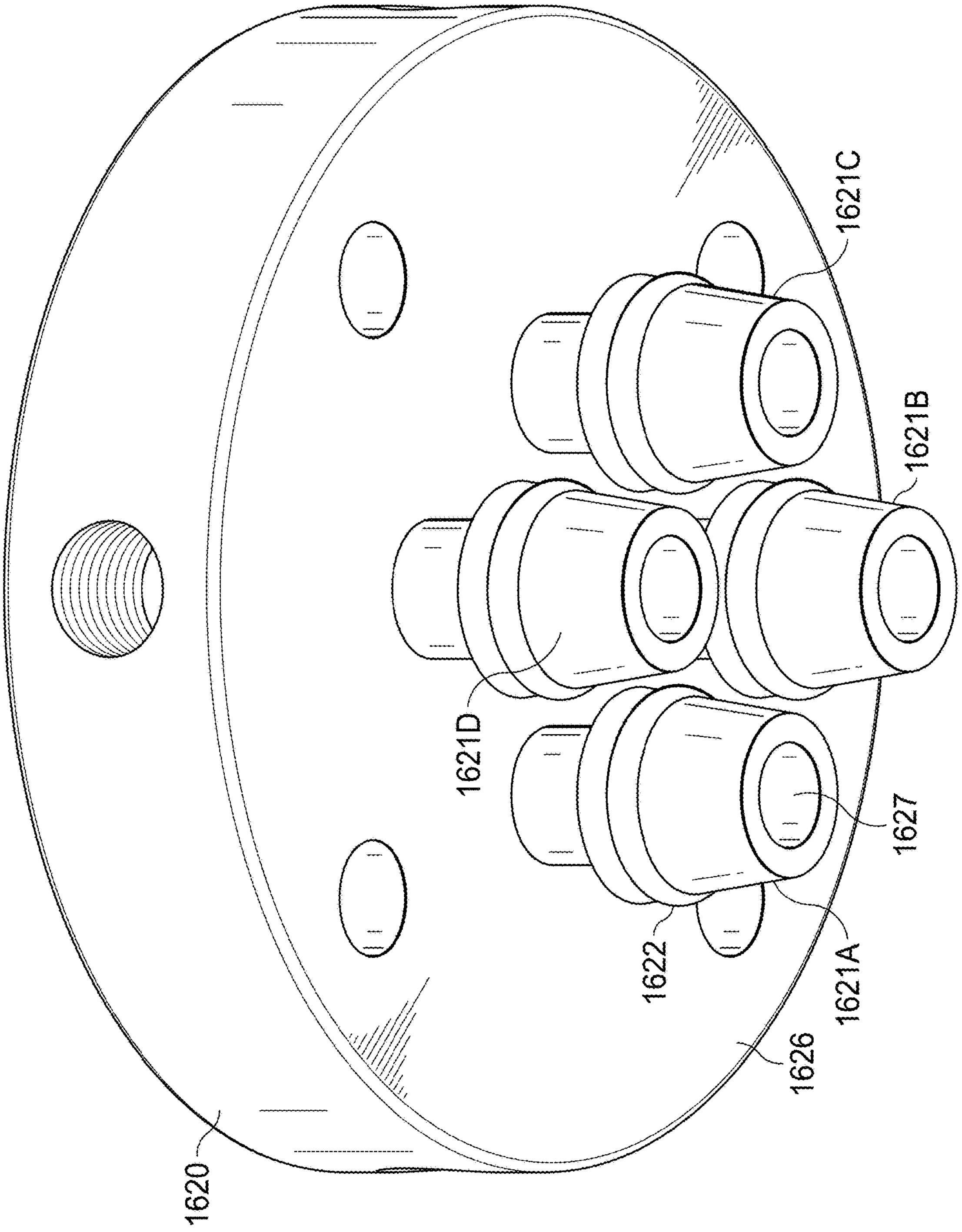

In some embodiments, manifold 1610 includes upper manifold section 1620. Additional details of upper manifold section 1620 are shown in FIGS. 18-19. In general, upper manifold section 1620 mechanically couples to lower manifold section 1630 and provides a mechanical interface for sealing inflatable bladders 850 and for supplying air pressure to inflate inflatable bladders 850 within hollow multi-blade rotor 1400 during manufacturing. In some embodiments, upper manifold section 1620 is cylindrical in shape as illustrated and may include an upper surface 1625 and a lower surface 1626 that is opposite upper surface 1625. In other embodiments, upper manifold section 1620 may have any other appropriate shape. In some embodiments, upper manifold section 1620 is formed of metal, plastic, a composite, or any other appropriate material. In some embodiments, upper manifold section 1620 includes multiple sealing ports 1621, one or more fasteners 1623, and at least one pressure port 1624, each of which are described in more detail below.

In some embodiments, upper manifold section 1620 includes multiple sealing ports 1621 that extend from lower surface 1626 of upper manifold section 1620 (illustrated best in FIGS. 18-19). In general, each sealing port 1621 is a tubular member (i.e., a hollow cylinder) that permits air to flow through sealing port 1621 and into an inflatable bladder 850 within a hollow blade 110 of hollow multi-blade rotor 1400 during manufacturing. In some embodiments, sealing ports 1621 are at least partially conical in shape as illustrated. In these embodiments, the conical shape of sealing ports 1621 may include a larger diameter at a first end 1810 and a smaller diameter at an opposite end 1820 of sealing ports 1621. In some embodiments, first end 1810 of sealing port 1621 contacts lower surface 1626 of upper manifold section 1620. In other embodiments, as illustrated in FIGS. 18-19, each sealing port 1621 includes a neck 1629 such that there is separation between lower surface 1626 of upper manifold section 1620 and first end 1810 of sealing ports 1621. In some embodiments, sealing ports 1621 may be tubular in shape with a constant diameter along the length of the sealing port 1621 (i.e., not conical in shape).

In some embodiments, each sealing port 1621 includes a sealing ring 1622. In these embodiments, each sealing port 1621 may include a groove 1830 for accommodating sealing ring 1622. Each sealing ring 1622 may be formed from rubber, silicone, or any other appropriate deformable material that is capable of forming an air-tight seal with inflatable bladders 850.

In some embodiments, each sealing port 1621 corresponds to exactly one hollow blade 110 of hollow multi-blade rotor 1400 such that there is a one-to-one correspondence between a number of sealing ports 1621 to a number of hollow blades 110. For example, in the illustrated embodiment of FIGS. 17-19, upper manifold section 1620 includes four sealing ports 1621A-D-one for each of the four hollow blades 110A-D of hollow multi-blade rotor 1400.

In general, upper manifold section 1620 couples to lower manifold section 1630 in order to form an air-tight seal with inflatable bladders 850 within hollow blades 110 of hollow multi-blade rotor 1400 during manufacturing. To do so, some embodiments of upper manifold section 1620 include one or more fasteners 1623. In some embodiments, fasteners 1623 are threaded bolts that may be inserted into fastener apertures 1632 of lower manifold section 1630 and then threaded into threaded bolt holes within top mold 1510 (not illustrated). In other embodiments, upper manifold section 1620 may utilize any other appropriate mechanism to be securely coupled to lower manifold section 1630 (e.g., snap hook lock, toggle clamp, latch clamp, etc.).

As illustrated in FIG. 18, upper manifold section 1620 includes a pressure port 1624 that is fluidly coupled to each sealing port 1621 and is configured to direct air pressure from an external air pressure source (e.g., an air compressor) to each of the sealing ports 1621. For example, a threaded adapter may be threaded into pressure port 1624 that allows an air hose from an air compressor to supply air pressure to upper manifold section 1620. As illustrated in FIG. 18, hollow tubes 1627 within sealing ports 1621 are fluidly coupled to pressure port 1624 so that any air pressure supplied to pressure port 1624 is directed to all sealing ports 1621. In some embodiments, an internal chamber 1628 may be machined within upper manifold section 1620 that allows all hollow tubes 1627 to be fluidly coupled to pressure port 1624. In other embodiments, flexible tubes or pipes may couple each hollow tube 1627 to pressure port 1624. In some embodiments, upper manifold section 1620 may include additional or alternate locations for pressure port 1624 (e.g., on the sides of upper manifold section 1620 as illustrated).

Figure 20:
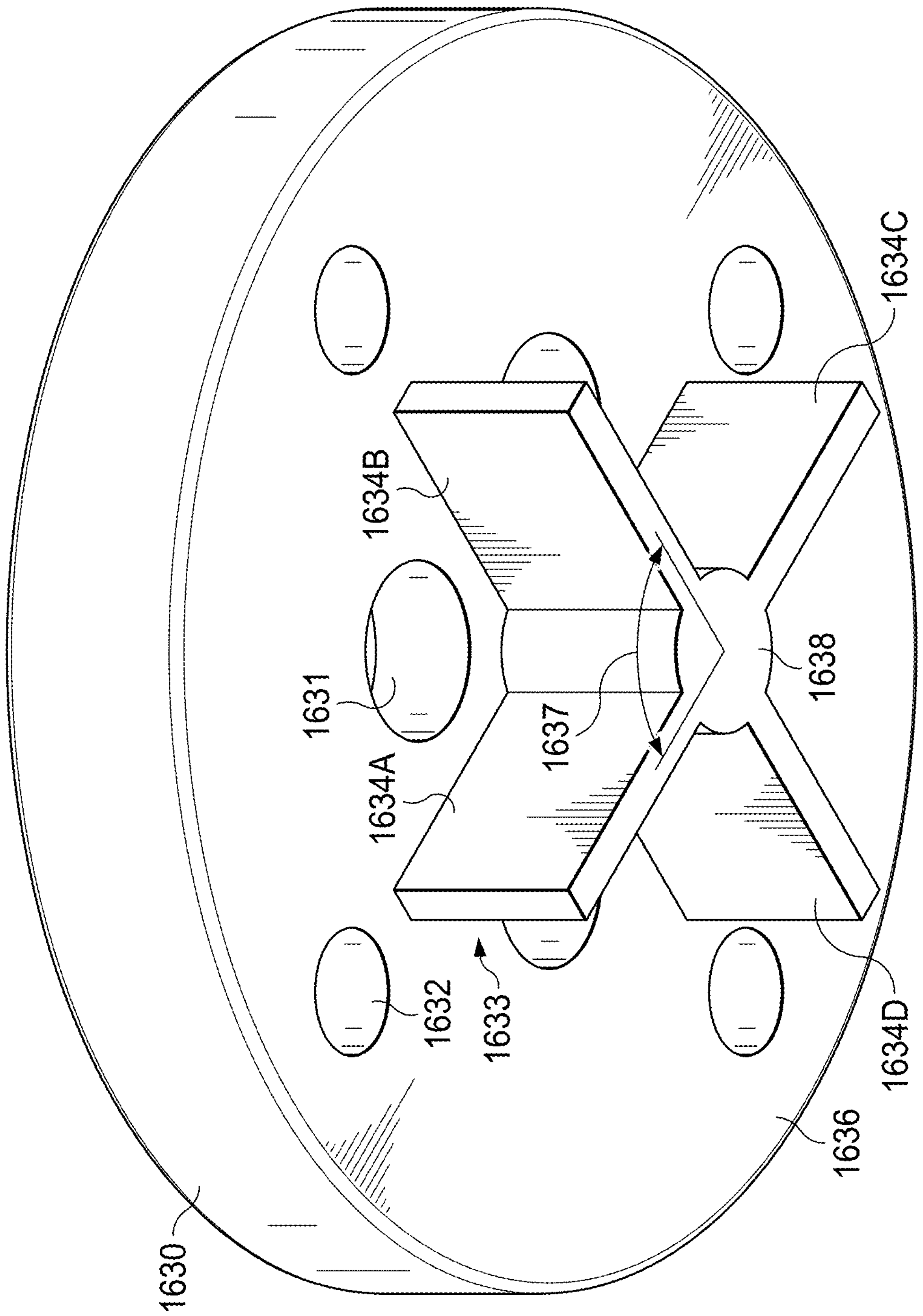
FIG. 20 illustrates a lower manifold section of the manifold apparatus of FIG. 16, according to certain embodiments.

In some embodiments, manifold 1610 includes lower manifold section 1630. Additional details of lower manifold section 1630 are shown in FIG. 20. In general, lower manifold section 1630 mechanically couples to upper manifold section 1620 and provides a mechanical interface for sealing inflatable bladders 850 and for supplying air pressure to inflate inflatable bladders 850 within hollow multi-blade rotor 1400 during manufacturing. In some embodiments, lower manifold section 1630 is cylindrical in shape as illustrated and may include an upper surface 1635 and a lower surface 1636 that is opposite upper surface 1635. In other embodiments, lower manifold section 1630 may have any other appropriate shape. In some embodiments, lower manifold section 1630 is formed of metal, plastic, a composite, or any other appropriate material. In some embodiments, lower manifold section 1630 includes multiple sealing port apertures 1631, one or more fastener apertures 1632, and a keying feature 1633, each of which are described in more detail below.

In some embodiments, lower manifold section 1630 includes multiple sealing port apertures 1631 that extend entirely through lower manifold section 1630 (i.e., from upper surface 1635 to lower surface 1636). In general, each sealing port aperture 1631 is configured to permit sealing ports 1621 to be inserted (ether fully or partially) into lower manifold section 1630 in order to allow sealing rings 1622 to form air-tight seals with inflatable bladders 850. In some embodiments, sealing port apertures 1631 match the shapes of sealing ports 1621. For example, if sealing ports 1621 are conical in shape as illustrated, sealing port apertures 1631 may have corresponding conical shapes (e.g., a larger diameter at upper surface 1635 and a smaller diameter at lower surface 1636). In other embodiments, however, sealing port apertures 1631 may be tubular in shape with a constant diameter along the entire length of the sealing port aperture 1631 (i.e., not conical in shape). In some embodiments, each sealing port aperture 1631 corresponds to exactly one hollow blade 110 of hollow multi-blade rotor 1400 such that there is a one-to-one correspondence between a number of sealing port apertures 1631 to a number of hollow blades 110. For example, in the illustrated embodiment of FIGS. 17-20, lower manifold section 1630 includes four sealing port apertures 1631A-D—one for each of the four hollow blades 110A-D of hollow multi-blade rotor 1400.

In general, lower manifold section 1630 couples to upper manifold section 1620 in order to form an air-tight seal with inflatable bladders 850 within hollow blades 110 of hollow multi-blade rotor 1400 during manufacturing. To do so, some embodiments of lower manifold section 1630 include one or more fastener apertures 1632. In some embodiments, fastener apertures 1632 are threaded or unthreaded holes that may accept fasteners 1623 (e.g., threaded bolts). In other embodiments, lower manifold section 1630 may utilize any other appropriate mechanism to be securely coupled to upper manifold section 1620 (e.g., snap hook lock, toggle clamp, latch clamp, etc.).

In some embodiments, lower manifold section 1630 includes a keying feature 1633 as best illustrated in FIG. 20. In general, keying feature 1633 is configured to engage with keyways 1644 of bladder extensions 1643 on pressure pads

1640. Furthermore, keying feature 1633 is configured to prevent misalignment of bladder extensions 1643 with sealing port apertures 1631 of lower manifold section 1630. In some embodiments, keying feature 1633 includes multiple members 1634 that are connected to a center member 1638 as illustrated. Center member 1638 may be, for example, circular or tubular in shape as illustrated. Each member 1634 may be any appropriate shape that matches keyway 1644 of bladder extension 1643 (e.g., a rectangular blade as illustrated). In some embodiments, each member 1634 of keying feature 1633 corresponds to exactly one hollow blade 110 of hollow multi-blade rotor 1400 such that there is a one-to-one correspondence between a number of members 1634 to a number of hollow blades 110. For example, in the illustrated embodiment of FIG. 20, manifold apparatus 1600 includes four members 1634A-D-one for each of the four hollow blades 110A-D of hollow multi-blade rotor 1400. In some embodiments, an angle 1637 between adjacent members 1634 of keying feature 1633 may correspond to the number of hollow blades 110 of hollow multi-blade rotor 1400. For example, if hollow multi-blade rotor 1400 includes four hollow blades 110A-D as illustrated, angle 1637 may be ninety degrees (i.e., 360 degrees divided by four). As another example, if hollow multi-blade rotor 1400 includes six hollow blades, angle 1637 may be sixty degrees (i.e., 360 degrees divided by six).

Figure 21A:
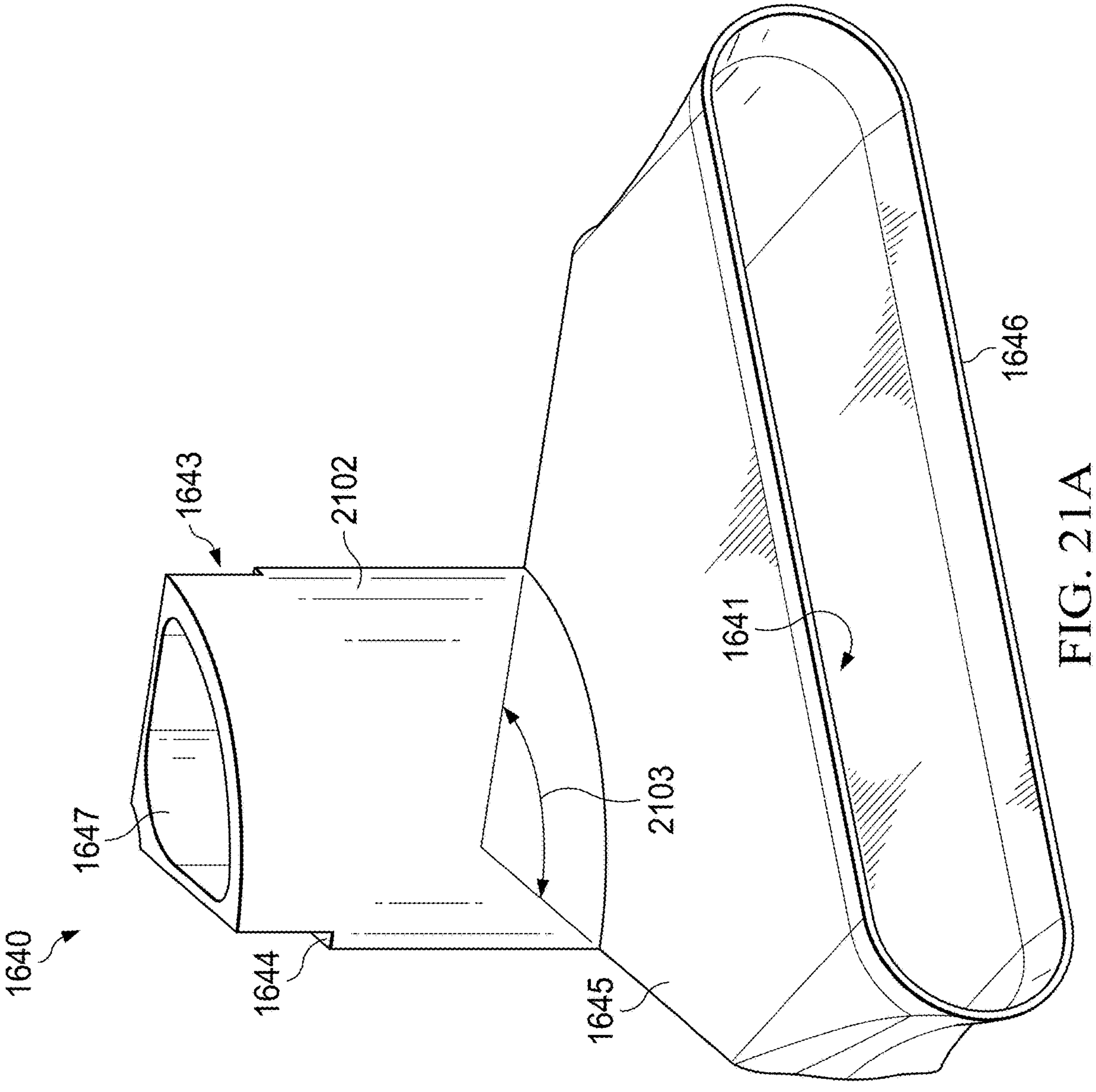
FIGS. 21A-21B illustrate a pressure pad that may be used by the system of FIG. 15, according to certain embodiments.
Figure 21B:
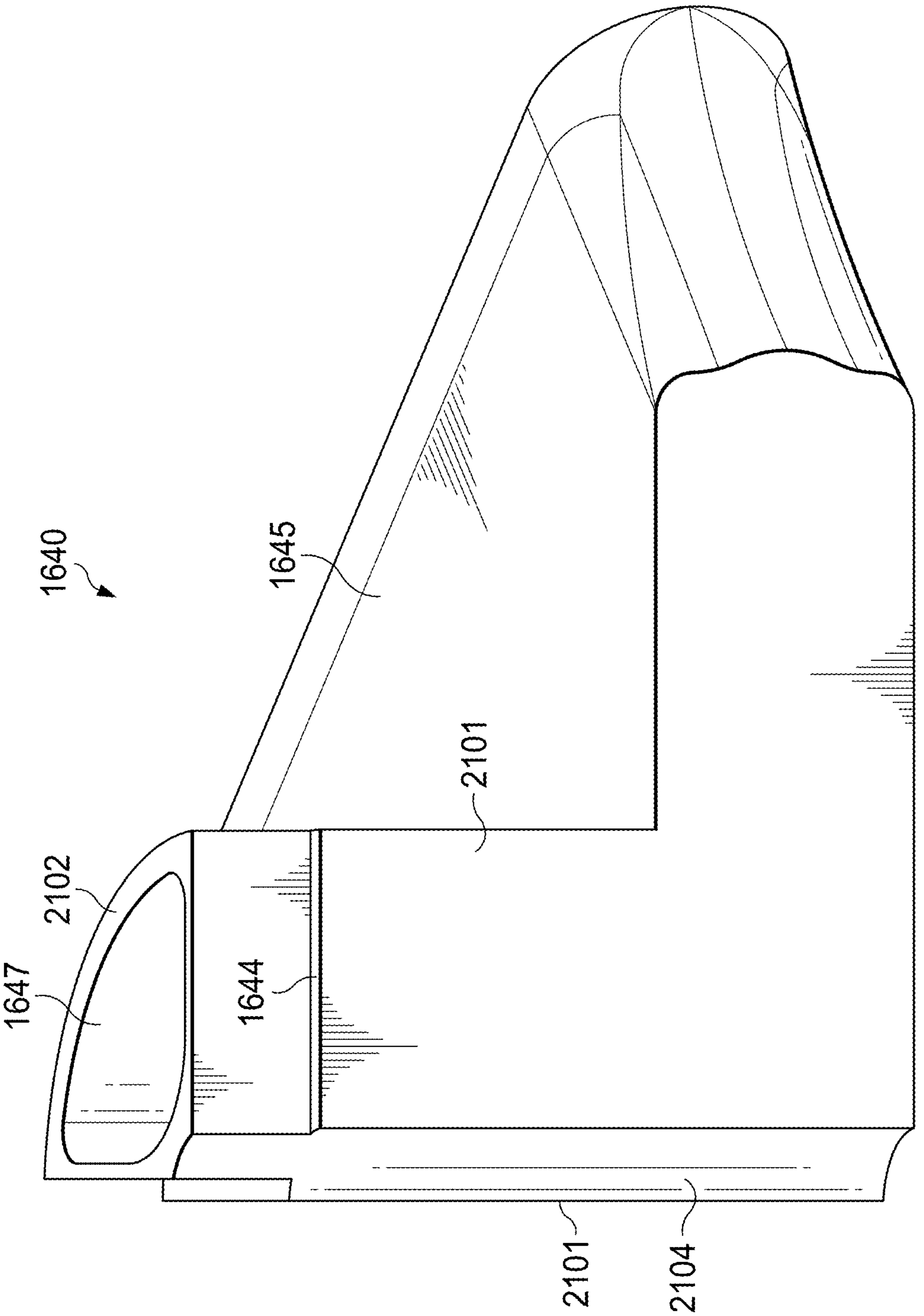

In some embodiments, manifold apparatus 1600 includes multiple pressure pads 1640. Additional details of pressure pads 1640 are shown in FIGS. 21A-B. In general, pressure pads 1640 collectively help form, shape, and support hollow hub area 120 and main hub aperture 122 of hollow multi-blade rotor 1400 within molds 1510 and 1520 during manufacturing of hollow multi-blade rotor 1400. Pressure pads 1640 may be formed from any deformable material (e.g., silicone, rubber, etc.) so that each pressure pad 1640 may be deformed or compacted and then removed through main hub aperture 122 of hollow multi-blade rotor 1400 after manufacturing. In some embodiments, each pressure pad 1640 corresponds to exactly one hollow blade 110 of hollow multi-blade rotor 1400 such that there is a one-to-one correspondence between a number of pressure pads 1640 to a number of hollow blades 110. For example, in the illustrated embodiment of FIGS. 15-17, manifold apparatus 1600 includes four pressure pads 1640A-D-one for each of the four hollow blades 110A-D of hollow multi-blade rotor 1400.

In some embodiments, each pressure pad 1640 includes a bladder extension 1643, an inner chamber 1641, sides 2101, an upper surface 1645, and a lower surface 1646. Bladder extension 1643 in general extends upward (e.g., perpendicular) from upper surface 1645 and is configured to contact lower surface 1636 of lower manifold section 1630 during manufacturing of hollow multi-blade rotor 1400. Each bladder extension 1643 includes a hollow passage 1647 that is configured to hold a portion of an inflatable bladder 850 during manufacturing of hollow multi-blade rotor 1400. In some embodiments, each bladder extension 1643 includes three sides as illustrated: two flat sides 2101 and a curved side 2102. Each flat side 2101 of bladder extension 1643 may be extensions of (and form portions of) the sides of pressure pad 1640, as illustrated. In some embodiments, an angle 2103 between flat sides 2101 may correspond to the number of hollow blades 110 of hollow multi-blade rotor 1400. For example, if hollow multi-blade rotor 1400 includes four hollow blades 110A-D as illustrated, angle 2013 may be ninety degrees (i.e., 360 degrees divided by four). As another example, if hollow multi-blade rotor 1400 includes six hollow blades, angle 2013 may be sixty degrees (i.e., 360 degrees divided by six). In some embodiments, bladder extension 1643 may include an additional side 2104 that matches the shape of center member 1638 of keying feature 1633, as illustrated.

In some embodiments, cross-sectional shapes of bladder extensions 1643 collectively form the overall shape of main hub aperture 122 (e.g., a circle). For example, as illustrated in FIG. 16, the four bladder extensions 1643 have shapes that collectively form the circular shape of main hub aperture 122. In the illustrated embodiments where hollow multi-blade rotor 1400 includes four hollow blades 110, a cross-sectional shape of each bladder extension 1643 is a quarter circle (i.e., one curved side 2102 and two straight sides 2101 at a 90-degree angle). In other embodiments with more or fewer than four hollow blades 110, the cross-sectional shapes of bladder extension 1643 will have corresponding portions of a circle. For example, if hollow multi-blade rotor 1400 includes five hollow blades 110, the cross-sectional shape of each bladder extension 1643 would be one-fifth of a circle (i.e., one curved side 2102 and two straight sides 2101 at a 72-degree angle 2103). As another example, if hollow multi-blade rotor 1400 includes three hollow blades 110, the cross-sectional shape of each bladder extension 1643 would be one-third of a circle (i.e., one curved side 2102 and two straight sides 2101 at a 120-degree angle 2103).

Keyway 1644 is a cutout feature of bladder extension 1643 that corresponds to keying feature 1633. Each keyway 1644 may be any appropriate size and shape that matches member 1634 of keying feature 1633 (e.g., a rectangular cutout to match a blade shape of member 1634 as illustrated). In some embodiments, each keyway 1644 is a cutout portion of an upper portion of each side 2101, as illustrated.

Inner chamber 1641 is a hollow void within each pressure pad 1640 that is formed by the sides 2101 and surfaces 1645 and 1646 of the pressure pad 1640. The inner chamber 1641 of each particular pressure pad 1640 is connected to the hollow passage 1647 of the bladder extension 1643 of the particular pressure pad 1640. In this manner, the inflatable bladder 850 for a particular hollow blade 110 may pass through the inner chamber 1641 of the pressure pad 1640 for the particular hollow blade 110, travel up through the hollow passage 1647 of the bladder extension 1643 of the pressure pad 1640, and up through a corresponding sealing port aperture 1631 of lower manifold section 1630. An end of the inflatable bladder 850 may then be sealed by sealing ring 1622 of a corresponding sealing port 1621 when upper manifold section 1620 is coupled to lower manifold section 1630.

In operation, manifold apparatus 1600, along with molds 1510 and 1520 and multiple inflatable bladders 850, may be used to manufacture hollow multi-blade rotor 1400. To do so, skin layups are first placed into molds 1510 and 1520 (e.g., a top skin layup similar to top skin layup 830 is placed into top mold 1510 and a bottom skin layup similar to bottom skin layup 840 is placed into bottom mold 1520). Edge layups such as edge layups 140A and 140B may then be placed on the bottom skin layup in bottom mold 1520. An inflatable bladder 850 and a pressure pad 1640 for each hollow blade 110 is then placed on the bottom skin layup in bottom mold 1520. In some embodiments, inflatable bladder 850 can be wrapped on a solid foam or soluble mandrel 1650 that can be removed together with the inflatable bladder 850 after curing. A sealed end of each inflatable bladder 850 is placed at the wingtip of each particular hollow blade 110, and an unsealed end that is opposite the sealed end is passed into the inner chamber 1641 of the pressure pad 1640 for that particular hollow blade 110. The unsealed end of each inflatable bladder 850 is passed up through the bladder extension 1643 of the pressure pad 1640. Molds 1510 and 1520 may then fastened together.

Once molds 1510 and 1520 are fastened together, lower manifold section 1630 may be positioned onto bladder extensions 1643 such that the unsealed ends of each inflatable bladder 850 are passed into respective sealing port apertures 1631 of lower manifold section 1630. Upper manifold section 1620 may then be placed onto lower manifold section 1630 such that each sealing port 1621 is inserted into an unsealed end of one of the inflatable bladders 850 that are extending out of sealing port apertures 1631. As upper manifold section 1620 is coupled to lower manifold section 1630 (e.g., using fasteners 1623), sealing rings 1622 form air-tight seals around the unsealed ends of the inflatable bladders 850. Air pressure may then be applied via pressure port 1624 in order to inflate inflatable bladders 850. The entire system may then be heated (e.g., in an oven or autoclave) in order to cure the skin layups. Once cured, molds 1510 and 1520 may be decoupled. Inflatable bladders 850 and pressure pads 1640 may then be removed through main hub aperture 122, thereby leaving hollow multi-blade rotor 1400.

Figure 22:
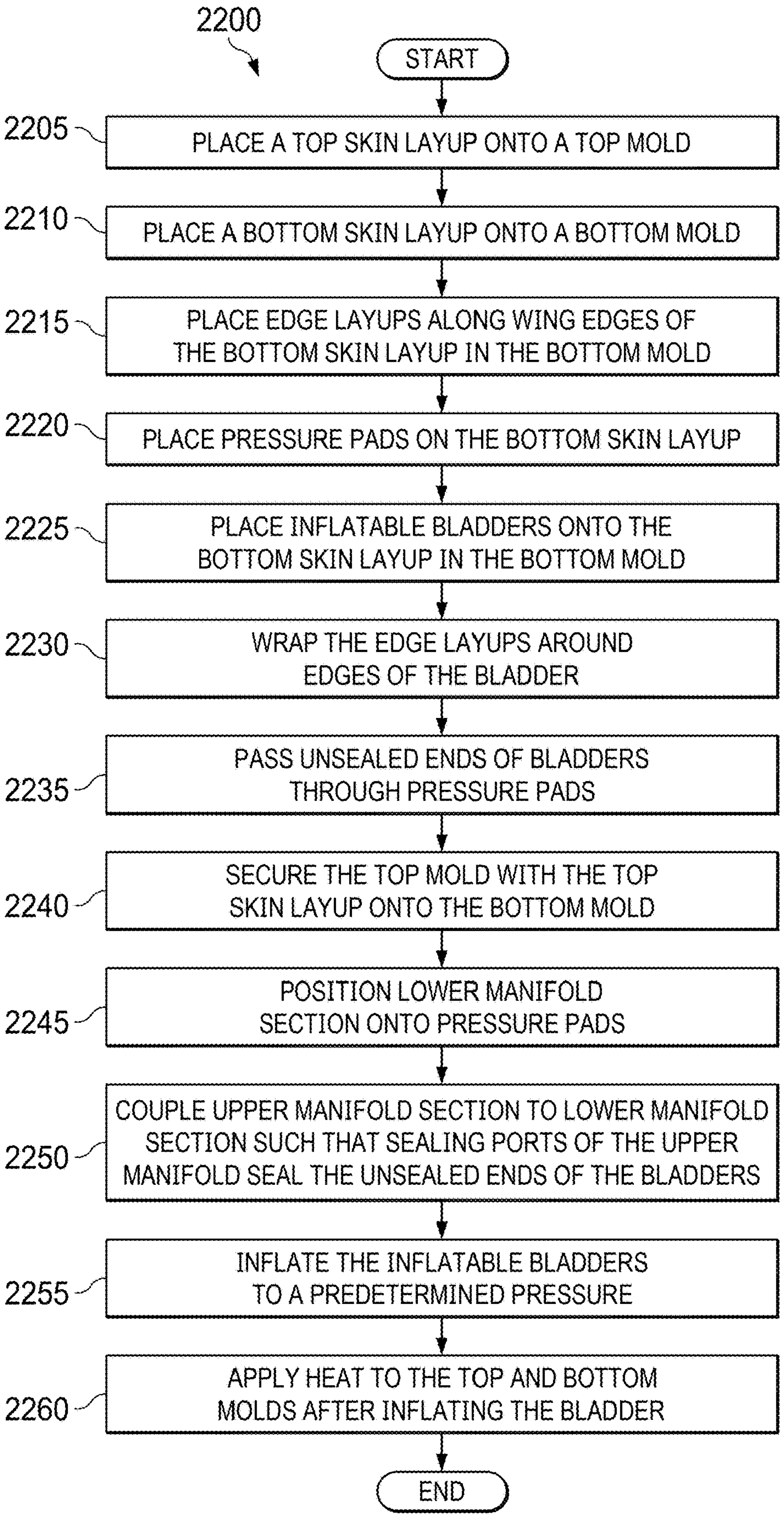
FIG. 22 is a flow diagram of a method of manufacturing a hollow multi-blade rotor having more than two hollow blades, according to certain embodiments.

FIG. 22 is a flow diagram of a method 2200 of manufacturing a hollow multi-blade rotor having more than two hollow blades (e.g., hollow multi-blade rotor 1400), according to certain embodiments. In some embodiments, method 2200 may be used to manufacture hollow multi-blade rotor 1400. In step 2205, a top skin layup is placed onto a top mold. In some embodiments, the top mold is top mold 1510 and the top skin layup is top skin layup 830 that is sized and shaped appropriately for hollow multi-blade rotor 1400. The top skin layup may be formed from carbon fiber or a carbon fiber composite and may be in a shape of a top side of hollow multi-blade rotor 1400. For example, the top skin layup may be in a shape of the top of four hollow blades 110 (e.g., 110A-110D in FIG. 14) with a hollow hub area 120 between the four hollow blades 110 as illustrated.

In step 2210, a bottom skin layup is placed onto a bottom mold. In some embodiments, the bottom mold is bottom mold 1520 and the bottom skin layup is bottom skin layup 840 that is sized and shaped appropriately for hollow multi-blade rotor 1400. The bottom skin layup may be formed from carbon fiber or a carbon fiber composite and may be in a shape of a bottom side of hollow multi-blade rotor 1400. For example, the bottom skin layup may be in a shape of the bottom of four hollow blades 110 (e.g., 110A-110D in FIG. 14) with a hollow hub area 120 between the four hollow blades 110 as illustrated.

In step 2215, edge layups are placed along wing edges of the bottom skin layup in the bottom mold. In some embodiments, the edge layups may be placed along leading and trailing edges of hollow blades 110 (e.g., 110A-D). In some embodiments, the edge layups may be similar to edge layups 140A-B as described above. In some embodiments, the edge layups may be continuous narrow strips (i.e., single pieces) of carbon fiber or carbon fiber composite material.

In step 2220, pressure pads are placed on the bottom skin layup. In some embodiments, the pressure pads are pressure pads 1640 that are placed about hollow hub area 120. In some embodiments, a single pressure pad is placed on the bottom skin layup for each hollow blade (i.e., if there are four hollow blades, then four pressure pads are placed on the bottom skin layup).

In step 2225, inflatable bladders such as inflatable bladders 850 are placed onto the bottom skin layup in the bottom mold. Each inflatable bladder may have a sealed end and an unsealed end. Each inflatable bladder may be placed on the bottom skin layup such that its sealed end is located at a wingtip of a blade and its unsealed end may be placed at hollow hub area 120. In some embodiments, the inflatable bladders are constructed as explained above in reference to FIG. 12. In other embodiments, the inflatable bladders can be manufactured using other techniques (e.g., a reusable latex or silicone bladder.) In some embodiments, each inflatable bladder is wrapped on a solid foam or soluble mandrel 1650.

After the inflatable bladders are placed onto the bottom skin layup in the bottom mold in step 2225, step 2230 may be performed. In step 2230, the edge layups from step 2215 are wrapped around edges of the inflatable bladders. FIG. 8 illustrates how each edge layup 140 has been wrapped around a respective edge of an inflatable bladder 850.

At step 2235, the unsealed ends of the inflatable bladders are passed through the pressure pads. Using hollow blade 110C as a specific example, the unsealed end of the inflatable bladder for hollow blade 110C is first passed into inner chamber 1641 of pressure pad 1640C. The unsealed end of the inflatable bladder is then passed up and out of the bladder extension 1643 of pressure pad 1640C. In embodiments where the inflatable bladder is wrapped around mandrel 1650, a portion of the mandrel 1650 is inserted into pressure pad 1640C such that the inflatable bladder is located between pressure pad 1640C and mandrel 1650. This step is repeated for each hollow blade 110.

In step 2240, the top mold that includes the top skin layup is secured onto the bottom mold as illustrated in FIG. 15. In some embodiments, the top mold and the bottom mold are secured together with bolts similar to the embodiment illustrated in FIG. 13C. In other embodiments, the top mold and the bottom mold are secured together using any other appropriate mechanism.

At step 2245, a lower manifold section is positioned onto the pressure pads. In some embodiments, the lower manifold section is lower manifold section 1630. In some embodiments, this step includes utilizing a keying feature such as keying feature 1633 in order to align sealing port apertures (e.g., sealing port apertures 1631) of the lower manifold section with bladder extensions (e.g., bladder extensions 1643) of the pressure pads. Furthermore, this step includes passing the unsealed ends of the inflatable bladders (that are protruding from bladder extensions 1643) up through their respective sealing port apertures of the lower manifold section.

At step 2250, an upper manifold section is coupled to the lower manifold section of step 2245. In some embodiments, the upper manifold section is upper manifold section 1620. The upper manifold section may be coupled to the lower manifold section using fasteners (e.g., fasteners 1623) or any other appropriate mechanism. For this step, sealing ports of the upper manifold section (e.g., sealing ports 1621) are inserted into the sealing port apertures of the lower manifold section and into the unsealed ends of the inflatable bladders that are protruding from the sealing port apertures (from step 2245). Sealing rings (e.g., sealing rings 1622) of the sealing ports contact the unsealed ends of the inflatable bladders and form an air-tight seal when the upper manifold section is secured to the lower manifold section.

In step 2255, air pressure is applied to a pressure port (e.g., pressure port 1624) of the upper manifold section in order to inflate the inflatable bladders to a predetermined pressure. In some embodiments, the predetermined pressure is between 50-55 psi. In some embodiments, the inflatable bladders are inflated using compressed air, nitrogen, or any other appropriate gas.

In step 2260, heat is applied to the coupled top and bottom molds after the inflatable bladders have been inflated. In some embodiments, step 2260 includes placing the coupled top and bottom molds into an oven or an autoclave. In some embodiments, step 2260 includes utilizing one or more electric heating elements that are coupled to or embedded within one or both of the top and bottom molds. Step 2260 cures the top skin layup and the bottom skin layup, thereby forming hollow multi-blade rotor 1400. After step 2260, method 2200 may end.

In some embodiments, method 2200 may additionally include deflating the inflatable bladders after step 2260. In some embodiments, this may include using the pressure port of the upper manifold section. After the inflatable bladders have been deflated, method 2200 may also include removing the upper and lower manifold sections. After the upper and lower manifold sections have been removed, the top mold may be decoupled and removed from the bottom mold. Next, the deflated inflatable bladders and the pressure pads may be removed through main hub aperture 122 (i.e., after one or both of the top and bottom molds are removed).

In some embodiments, method 2200 may include adding additional components to strengthen the edges and tips of hollow multi-blade rotor 1400. For example, FIG. 11 illustrates a tip preform 1101 and an epoxy adhesive filler 1102 that may be utilized by method 2200 when forming hollow multi-blade rotor 1400. Tip preform 1101 (also known in the industry as a "noodle") may be formed from unidirectional fiber-reinforced tape using molds. In these embodiments, tip preform 1101 may be applied directly on top of the bottom skin layup after step 2210. The edge layups may then be applied on top of tip preform 1101 in step 2215. Finally, epoxy adhesive filler 1102 may be applied on top of the edge layups.

In some embodiments, method 2200 may use an additional edge preform ("noodle") as edge filler 150 as illustrated in FIG. 4. The edge preform may be formed from unidirectional fiber-reinforced tape using molds. In these embodiments, the edge preform may be applied directly on top of the bottom skin layup. An edge layup may then be applied on top of the edge preform. The edge preform (i.e., edge filler 150) fills the gap between the trailing edges of hollow blades 110 and the edge layups.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for manufacturing a hollow multi-blade rotor, the system comprising:

a manifold comprising an upper manifold section and a lower manifold section configured to couple to the upper manifold section, wherein:

the upper manifold section comprises:

a plurality of sealing ports that each comprise a sealing ring; and a pressure port fluidly coupled to each of the plurality of sealing ports and configured to direct air pressure from an external air pressure source to each of the plurality of sealing ports;

the lower manifold section comprises a plurality of sealing port apertures, each sealing port aperture configured to accept one of the sealing ports of the upper manifold section; and a plurality of pressure pads configured to collectively form a center hub area of the hollow multi-blade rotor within a mold during manufacturing of the hollow multi-blade rotor, each pressure pad comprising:

a hollow inner chamber configured to accept an inflatable bladder; and a hollow bladder extension that extends from a top surface of the pressure pad and is configured to contact a lower surface of the lower manifold section, wherein the bladder extension is configured to guide an unsealed end of the inflatable bladder up through a particular sealing port aperture of the lower manifold section, thereby enabling the unsealed end of the inflatable bladder to be sealed between the particular sealing port aperture and the sealing ring of a particular sealing port when the upper manifold section is coupled to the lower manifold section.

2. The system for manufacturing the hollow multi-blade rotor of claim 1, wherein the lower manifold section further comprises a keying feature coupled to the lower side of the lower manifold section, wherein:

the keying feature is configured to engage with a plurality of keyways of the bladder extensions on the plurality of pressure pads; and the keying feature is configured to prevent misalignment of the bladder extensions of the plurality of pressure pads with the plurality of sealing port apertures.

3. The system for manufacturing the hollow multi-blade rotor of claim 1, wherein:

each of the plurality of sealing ports extend from a lower surface of the upper manifold section;

each of the plurality of sealing ports are conical in shape; and each of the plurality of sealing port apertures are conical in shape.

4. The system for manufacturing the hollow multi-blade rotor of claim 1, wherein each of the plurality of pressure pads corresponds to exactly one blade of the hollow multi-blade rotor such that there is a one-to-one correspondence between a number of pressure pads to a number of blades of the hollow multi-blade rotor.

5. The system for manufacturing the hollow multi-blade rotor of claim 1, wherein:

the upper manifold section further comprises a plurality of fasteners;

the lower manifold section further comprises a plurality of fastener apertures, each fastener aperture configured to accept one of the fasteners of the upper manifold section; and the lower manifold section is configured to couple to the upper manifold section using the plurality of fasteners.

6. The system for manufacturing the hollow multi-blade rotor of claim 1, wherein each of the plurality of pressure pads are deformable.

7. The system for manufacturing the hollow multi-blade rotor of claim 1, wherein each hollow bladder extension of each particular pressure pad extends perpendicular from the top surface of the particular pressure pad.

8. The system for manufacturing the hollow multi-blade rotor of claim 1, wherein the upper manifold section and the lower manifold section are each cylindrical in shape.

9. The system for manufacturing the hollow multi-blade rotor of claim 1, wherein the hollow bladder extensions of the plurality of pressure pads collectively form a circular shape of a main hub aperture of the hollow multi-blade rotor.

* * * * *